(12) United States Patent
Nishida et al.

(10) Patent No.: US 7,008,070 B2
(45) Date of Patent: Mar. 7, 2006

(54) ILLUMINATION DEVICE AND PROJECTOR

(75) Inventors: Kazuhiro Nishida, Matsumoto (JP); Akira Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 10/853,159

(22) Filed: May 26, 2004

(65) Prior Publication Data

US 2005/0030749 A1  Feb. 10, 2005

(30) Foreign Application Priority Data

May 26, 2003 (JP) .............................. 2003-147981

(51) Int. Cl.
*F21V 9/14* (2006.01)
(52) U.S. Cl. ..................... 362/19; 362/293; 362/322; 362/330
(58) Field of Classification Search .................. 362/19, 362/293, 322–324, 330–332; 353/20, 84, 353/88–93
See application file for complete search history.

(56) References Cited

U.S. PATENT DOCUMENTS 6,257,726 B1 * 7/2001 Okuyama ..................... 353/20
6,312,130 B1 * 11/2001 Haba et al. ................... 353/34

FOREIGN PATENT DOCUMENTS

| JP | 05-066501 | 3/1993 |
|---|---|---|
| JP | 11-064850 | 3/1999 |
| JP | 2000-029138 | 1/2000 |
| JP | 2000-112030 | 4/2000 |
| JP | 2000-194067 | 7/2000 |
| JP | 2001-033773 | 2/2001 |
| JP | 2001-174774 | 6/2001 |
| JP | 2001-209140 | 8/2001 |
| JP | 2001-228569 | 8/2001 |
| JP | 2002-090705 | 3/2002 |
| JP | 2002-196302 | 7/2002 |
| WO | WO 95/22081 | 8/1995 |

* cited by examiner

*Primary Examiner*—John Anthony Ward
*Assistant Examiner*—Mark Tsidulko
(74) *Attorney, Agent, or Firm*—Oliff & Berridge, PLC

(57) ABSTRACT

An illumination device includes: a light source; a polarization converter (114) that converts a light beam irradiated by the light source into a substantially uniform linear polarized light, the polarization converter (114) being slanted relative to a central axis of the light beam irradiated by the light source and including a plurality of polarization-separating films (1141) and a plurality of light reflection films (1143) alternately arranged in a direction substantially orthogonal to the central axis of the light beam irradiated by the light source; an optical filter (311) provided between the light source and the polarization converter (114) and having a plurality of optical conversion layers, which are formed striped with the pitch thereof corresponding to the arrangement of the polarization-separating films (1141) to optically convert the incident light beam; a holder frame (312) that holds the optical filter (311); and a filter-driving mechanism (313) that moves the holder frame (312) in a direction in which the polarization-separating films (1141) are arranged.

15 Claims, 15 Drawing Sheets

SOLID LINE: TRANSMITTANCE PROPERTY OF FILTERING FILM (%)
DOTTED LINE: SPECTRUM INTENSITY OF LIGHT SOURCE LAMP (%)

SOLID LINE: TRANSMITTANCE PROPERTY OF FILTERING FILM (%)
DOTTED LINE: SPECTRUM INTENSITY OF LIGHT SOURCE LAMP (%)

SOLID LINE: TRANSMITTANCE PROPERTY OF FILTERING FILM (%)
DOTTED LINE: SPECTRUM INTENSITY OF LIGHT SOURCE LAMP (%)

ILLUMINATION DEVICE AND PROJECTOR

BACKGROUND OF THE INVENTION

1. Field of the Invention

The present invention relates to an illumination device equipped with an optical filter that converts luminance and/or color tone of a light beam irradiated by a light source, as well as a projector.

2. Description of Related Art

Conventionally, projectors have often been used for presentations at conferences, scientific meetings, exhibitions and the like. Such a projector is used as a data projector for mainly displaying characters, graphs and so on. Further, the projectors have remarkably been promoted recently, and such a projector having been used for the purpose of watching movies etc. at home as a home-theater projector.

In order to display characters and so on, the data projector requires displaying high-luminance image. On the other hand, in order to display video pictures of TV programs and movies etc., the home-theater projector requires to display high-chroma image (high-saturation image), which is colorful image emphasized on color reproducibility. Therefore, in terms of the image quality of the display image, there are various requirements such as luminance, chroma saturation, contrast or the like depending on the purpose of the projector. To meet with the requirements, there has been known a projector in which a filter is provided on an optical path in an optical system that modulates a light beam irradiated by a light source in accordance with image information to form an optical image, so that luminance, chroma saturation or the like is adjusted by the filter (for example, see patent document 1; JP2001-174774A, page 5, FIG. 3).

The filter applied to such projector has a filtering element formed corresponding to the pitch of a lens element of an integrator lens. The filter is moved so that the filtering element is inserted at the focal position of the light beam irradiated from the integrator lens.

However, while it is disclosed in the patent document 1 how the filter section is formed corresponding to the focal position of the light beam irradiated by the integrator lens and how the filter moves, the direction and the amount of the movement of the filter are not indicated.

Besides, not only the specific configuration of the filter and that of the mechanism for moving the filter are not disclosed, but also the method for switching between the high-luminance image and high-saturation image is not specifically described.

SUMMARY OF THE INVENTION

An object of the present invention is to provide an illumination device that can switch between a case converting a light beam and another case not converting, and a projector applying the illumination device.

An illumination device, includes: a light source; a polarization converter that converts a light beam irradiated by the light source into a substantially uniform linear polarized light, the polarization converter being slanted relative to a central axis of the light beam irradiated by the light source and including a plurality of polarization-separating films and a plurality of light reflection films alternately arranged in a direction substantially orthogonal to the central axis of the light beam irradiated by the light source; an optical filter provided between the light source and the polarization converter and having a plurality of optical conversion layers that optically converts the incident light beam, the optical conversion layers being arranged in stripes with a pitch corresponding to the arrangement of the polarization-separating films; a holder frame that holds the optical filter; and a filter-driving mechanism that moves the holder frame in a direction in which the polarization-separating films are arranged.

According to the above aspect of the present invention, the holder frame is moved by the filter-driving mechanism, so that the position of the optical conversion layers of the optical filter arranged striped by the pitch corresponding to the arrangement of the polarization-separating films is relatively consisted with the position of the light reflection films. Accordingly, the incident light beam can optically be converted to irradiate the converted light beam to the polarization converter arranged on the downstream. Similarly, the holder frame is moved so that the part of the optical filter without the optical conversion layer provided is relatively consisted with the position of the polarization-separating films. Accordingly, the incident light beam would not be converted to irradiate the unconverted light beam to the polarization converter.

Thus, the filter-driving mechanism sets and unsets the optical conversion layers of the optical filter on the optical path of the illumination light beam, so as to switch between the case optically converting the incident light beam and the other case not converting.

Incidentally, the striped optical conversion layers may be configured with films being formed in stripes by deposition or the like on a light transmissive board made of a sheet of glass or the like by masking etc. Alternatively, the layer may be configured with optically filtering glasses in which boards themselves absorb the predefined light and light transmissive boards by arranging them in a slit-like form and combining them.

Preferably, in the illumination device, the filter-driving mechanism may include: a cam rotatably supported by a light shield and engaged with the holder frame at an end thereof to move the holder frame by rotation of the cam; and a solenoid including a shaft engaged with the other end of the cam to electromagnetically move the shaft.

With this arrangement, since the movement of the shaft of the solenoid is controlled by applying the voltage, the configuration for controlling the movement of the optical filter by the filter-driving mechanism is simplified. Besides, since the movement of the shaft can be switched by applying and not applying the voltage, i.e., by selecting ON/OFF, setting and unsetting of the optical conversion layers of the optical filter for the optical path of the illumination light beam can be promptly carried out.

Preferably, in the illumination device, the holder frame may include a rack formed along a moving direction of the holder frame, and the filter-driving mechanism may include: a motor attached to a light shield with a rotary shaft thereof provided substantially in parallel to the central axis of the light beam irradiated by the light source; and a pinion provided on the rotary shaft of the motor to engage with the rack.

With this arrangement, the rotation of the pinion driven by the motor allows the holder frame to move continuously, so that the optical conversion layers are partially inserted on the optical path of the illumination light beam.

Accordingly, the partial insertion of the optical conversion layers on the optical path of the illumination light beam enables to adjust the degree of the conversion for the incident light beam continuously.

An illumination device includes: a light source; a polarization converter that converts a light beam irradiated by the light source into a substantially uniform linear polarized light, the polarization converter including a plurality of polarization-separating films and a plurality of light reflection films alternately arranged in a direction substantially orthogonal to a central axis of the light beam irradiated by the light source; an optical filter provided between the light source and the polarization converter and having a plurality of optical conversion layers that optically converts the incident light beam, the optical conversion layers being arranged in stripes with the pitch thereof corresponding to the arrangement of the polarization-separating films; a holder frame that holds the optical filter; and a filter-driving mechanism that rotates the holder frame in a plane substantially orthogonal to the central axis of the light beam irradiated by the light source.

According to the above aspect of the present invention, the same advantages as that of the above illumination device can be obtained. Specifically, the holder frame holding the optical filter is rotated by the filter-driving mechanism in the plane substantially orthogonal to the central axis of the light beam irradiated by the light source, so that the position of the optical conversion layers of the optical filter can be relatively and partially consisted with the position of the polarization-separating films. Accordingly, the optical filter is optically convert the part of the incident light beam to irradiate the converted light beam to the polarization converter disposed on the downstream of the optical filter on the optical path. On the other hand, the part of the optical filter without the optical conversion layers formed is relatively consisted with the position of the light reflection film by further rotating the holder frame from the position for converting the light beam or by rotating in the opposite direction, so that the incident light beam would not be converted. Accordingly, the unconverted light beam can be irradiated to the polarization converter. Besides, the light beam incident on the polarization converter can be switched between the case being optically converted and the other case not being converted.

Preferably, in the illumination device, the plurality of optical conversion layers may convert luminance and/or color tone of the light beam irradiated by the light source.

With this arrangement, when the plurality optical conversion layers convert luminance of the incident light beam, the low-luminance image and the high-luminance image can be switched depending on the purpose of use. Further, when converting color tone, the high-saturation image and the regular-saturation image can be switched depending on the purpose of use.

Preferably, in the illumination device, the plurality of optical conversion layers may reduce transmittance of a predefined color light of the light beam irradiated by the light source.

With this arrangement, since the optical conversion layers reduce transmittance of the specified color light, color tone of the illumination light beam can be corrected. Accordingly, the high-saturation projection image can be obtained depending on the purpose of use by applying the illumination device with the above optical conversion layer to a projector for instance.

Preferably, in the illumination device, the plurality of optical conversion layers may reduce transmittance of all wavelength range corresponding to a visible light of the light beam irradiated by the light source.

With this arrangement, since the optical conversion layers reduce transmittance of all wavelength range of the visible light, luminance of the illumination light beam can be adjusted. Accordingly, the low-luminance projection image can be obtained depending on the purpose of use by applying the illumination device with the above optical conversion layer to a projector for instance.

Preferably, in the illumination device, the plurality of optical conversion layers may be so formed that the transmittance thereof is reduced according to the distance from the central axis of the light beam irradiated by the light source.

With this arrangement, the transmittance of the light beam away from the illumination optical axis out of the light beam incident on the optical filter would be reduced. Note that, the light beam passing through the outer edge of the optical filter disturbs the wavelength balance of the entire light beam passing through the optical filter. Thus, since the light beam incident on the outer edge of the optical filter is reduced, the light beam can be converted with the wavelength balance of the light beam maintained to irradiate the converted light beam to the polarization converter.

Preferably, in the illumination device, the plurality of optical conversion layers may be provided on an outer edge of the optical filter, while no optical conversion layer is provided on an inner side thereof.

With this pattern, in terms of the light beam incident on the outer edge of the optical filter, the color tone thereof is converted, and also the amount of the transmitting light beam is reduced. On the other hand, in terms of the light beam incident on the inner side, reduction of the amount of the light beam as well as deterioration of the luminance can be minimized. Accordingly, high-saturation projection image with the contrast enhanced and the deterioration of the luminance minimized can be obtained by applying the illumination device with the above optical conversion layer to a projector for instance. Further, the same advantages can be expected even when the plurality of optical conversion layers are provided only on the four corners of the optical filter, or on the both ends of the optical filter in a direction in which the polarization-separating films are arranged while no optical conversion layer is provided on the middle part thereof.

Preferably, the illumination device may further includes: a light shield disposed on the polarization converter on a side near the light source to block a part of the light beam entering the polarization converter, in which the light shield includes a plurality of openings and a plurality of shield portions alternately arranged in a direction substantially orthogonal to the central axis of the light beam irradiated by the light source, in which the openings are formed in slit configuration corresponding to the polarization-separating films, and in which the shield portions are formed corresponding to the light reflection films.

This arrangement allows the light beam irradiated by the light source to pass through when the light beam enters the polarization-separating film of the polarization converter, and also to be blocked when the light beam enters the light reflection film of the polarization converter. That is, the light reflection film can prevent the light beam from being directly entered. Accordingly, the light beam irradiated by the polarization converter can avoid the polarized light of different types mixing thereto.

The above-described illumination device is suitable to a projector including: the above-described illumination device; a modulator that modulates a light beam irradiated by the illumination device in accordance with image information to form an optical image; and a projection lens that projects the optical image in an enlarged manner.

By applying such illumination device to the projector, the optical filter can optically convert the light beam in a prescribed manner, and the optical image with the image quality enhanced can be formed to be projected. Further, the conversion status can be switched between the one converting the incident light beam and the other one not converting, thus forming and projecting the optical image depending on the purpose of use.

Preferably, the projector may further include a power conditioning mechanism that regulates electric power being supplied to the light source to adjust luminance of the light beam irradiated by the light source.

With such power conditioning mechanism, the electric energy supplied to the light source is regulated so as to widen the luminance-adjusting range for the optical image to be projected. Accordingly, the power conditioning mechanism of the light source can adjust the luminance in wide range, which is unavailable for the optical corrector, thus adjusting the luminance of the optical image depending on the purpose of use.

Preferably, the projector may further include a diaphragm mechanism that partially blocks the light beam irradiated by the light source.

With such diaphragm, the amount of the light forming the optical image can easily be adjusted in wide range. Accordingly, the luminance of the optical image to be projected by the projector can easily be adjusted.

DETAILED DESCRIPTION OF PREFERRED EMBODIMENT(S)

Embodiments of the present invention will be described below with reference to the attached drawings. In the following description, an axis parallel to the advancing direction of a light is considered as a Z-axis whereas two axes orthogonal to the Z-axis are respectively considered as an X-axis and a Y-axis.

(1) First Embodiment

A first embodiment of the present invention will be described below with reference to the attached drawings.

Figure 1:
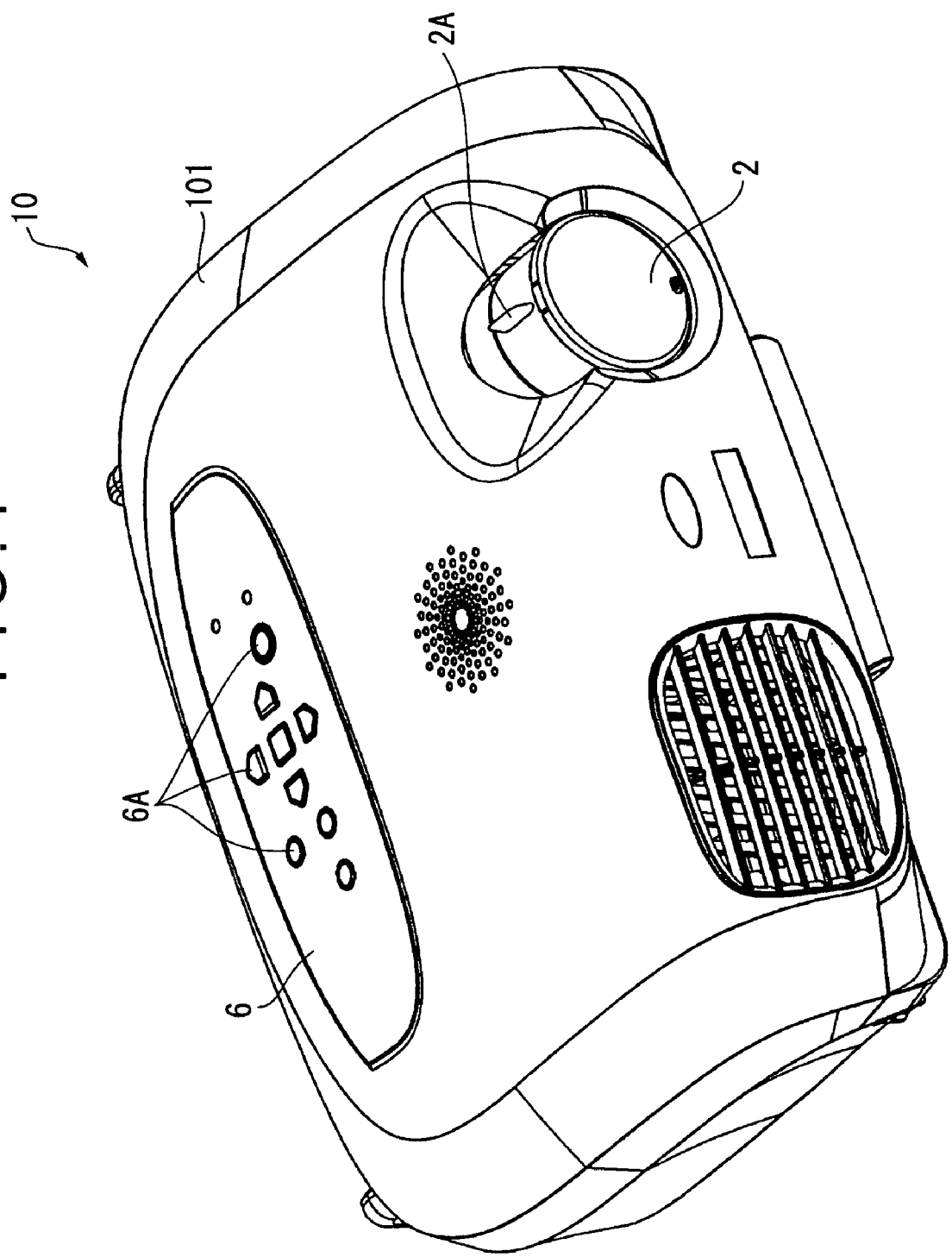
FIG. 1 is a perspective view showing a projector according to a first embodiment.

FIG. 1 shows a projector according to the first embodiment. The projector 10 modulates a light beam irradiated by a light source in accordance with image information and projects the light beam on a projection surface such as a screen in an enlarged manner. As shown in FIG. 1, the projector 10 has an exterior case 101 and a projection lens 2 exposed from the exterior case 101.

The exterior case 101 is a synthetic resin casing, which houses the body section of the projector 10. An operation panel 6 provided with a plurality of switches 6A for actuating and adjusting the projector 10 is provided on the upper side of the exterior case 101.

The projection lens 2 enlarges and projects the optical image modulated by the body section of the projector 10 in accordance with image information. The projection lens 2 is a lens set including a plurality of lenses housed in a cylindrical lens barrel, which has a lever 2A for changing the relative position of the plurality of lenses so that the focus and the magnification of the projection image can be adjusted.

Figure 2:
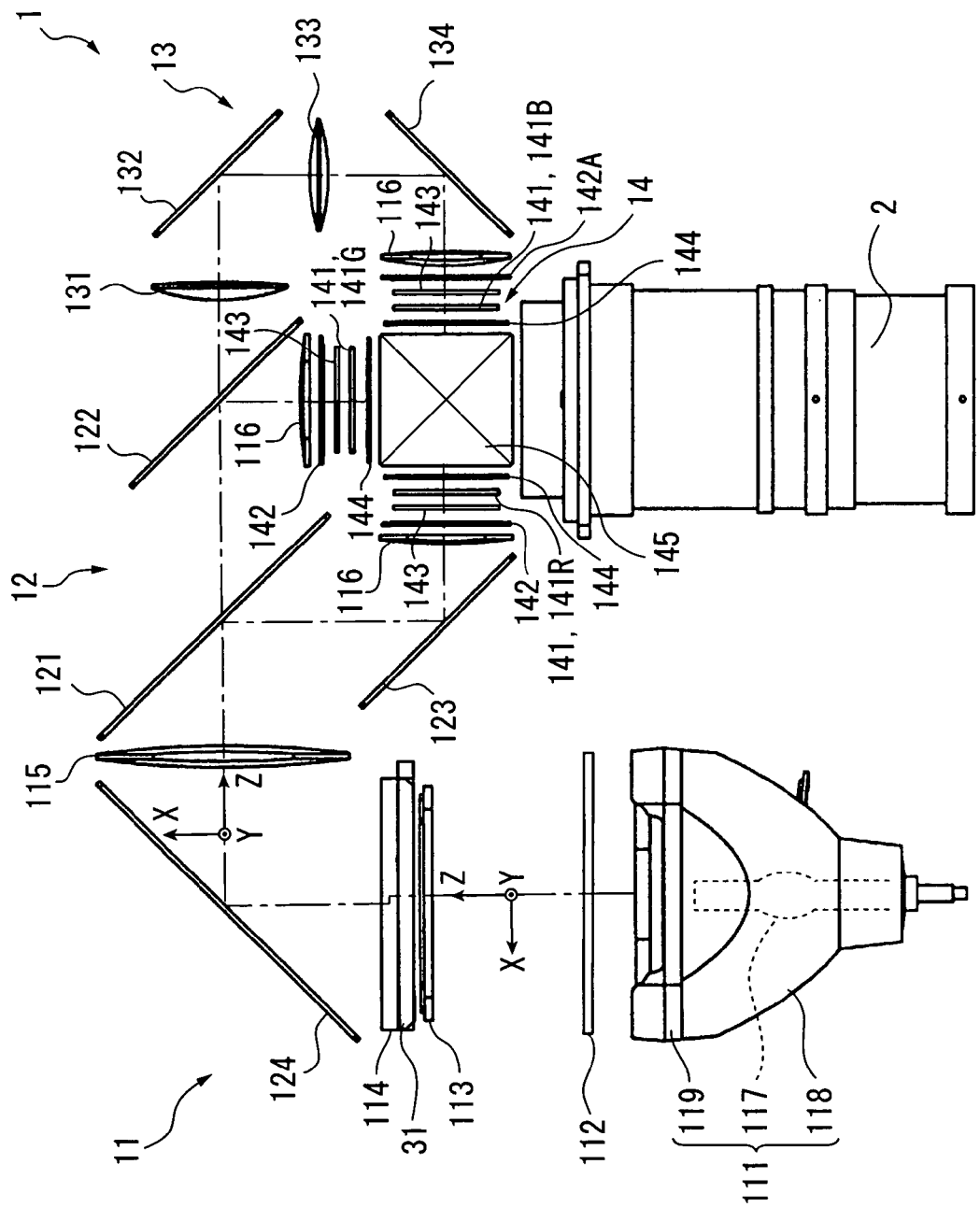
FIG. 2 is an illustration schematically showing an optical unit of the first embodiment.

FIG. 2 is an illustration schematically showing an optical unit 1 housed in the projector 10. The optical unit 1 modulates a light beam irradiated by a light source device 111 in accordance with the image information to form an optical image, and forms a projection image on a screen through the projection lens 2.

The optical unit 1 includes functionally independent components of an integrator illuminating optical system 11, a color-separating optical system 12, a relay optical system 13, an optical device 14 integrating an optical modulator and a color-combining optical device, and a light guide (not shown) in which the optical components 11, 12, 13 and 14 are housed.

The integrator illuminating optical system 11 (illumination device) is an optical system that integrates the light beam irradiated by the light source to be a light beam with the luminance thereof being equal on a plane (XY-plane) orthogonal to an illumination optical axis. The integrator illuminating optical system 11 has the light source device 111, a first lens array 112, a second lens array 113, an optical corrector 31, a polarization converter 114, a superposing lens 115 and a field lens 116. The optical corrector 31 is arranged on the upstream of the polarization converter 114. Note that, the "illumination optical axis" is a hypothetical axis formed by an optical element of the light source device 111, the axis consisting with the central axis of the light beam irradiated by the light source device 111.

The light source device 111 has a light source lamp 117 (a radial light source), a reflector 118, and an anti-explosion glass 119 covering the light-irradiation side of the reflector 118. The radial light beam irradiated by the light source lamp 117 is reflected by the reflector 118 to be an substantially parallel light beam and is irradiated toward the outside. In the first embodiment of the present invention, a high-pressure mercury lamp is used as the light source lamp 117 and a parabolic mirror is used as the reflector 118. Incidentally, the light source lamp 117 is not limited to a high-pressure mercury lamp, and may be a metal halide lamp or a halogen lamp. Besides, while a parabolic mirror is used as the reflector 118, a parallelizing concave lens disposed on an irradiation-side of a reflector of an ellipsoidal mirror may alternatively be used.

The first lens array 112 has small lenses arranged in a matrix, the lenses having substantially rectangular profile viewed in the illumination optical axis direction (Z-axial direction). The respective lenses separate the light beam irradiated by the light source lamp 117 into sub-beams and emits the sub-beams in the illumination optical axis direction.

The second lens array 113 is arranged substantially in the same manner as the first lens array 112, which includes small lenses arranged in a matrix. The second lens array 113 together with the superposing lens 115 focuses the image of the small lenses of the first lens array 112 onto liquid crystal panels 141R, 141G and 141B of the optical device 14 (described below).

The optical corrector 31 converts and corrects the light beam irradiated by the second lens array 113 by way of an optical filter held therein. The corrected light beam is irradiated to the polarization converter 114 disposed on the downstream of the optical filter of the optical corrector 31. The structure of the optical corrector 31 will be described below in detail.

The polarization converter 114 converts the light irradiated from the second lens array 113 into a substantially uniform polarized light. Since only uniform polarized light can be used in the projector using the liquid crystal panels 141R, 141G and 141B that modulate a polarized light, about half of the light beam irradiated from the light source lamp 117 emitting a random polarized light cannot be used. Accordingly, with the use of the polarization converter 114, all of the light beams irradiated by the light source lamp 117 are converted into the substantially uniform polarized light to enhance the light utilization efficiency of the optical device 14.

Figure 3:
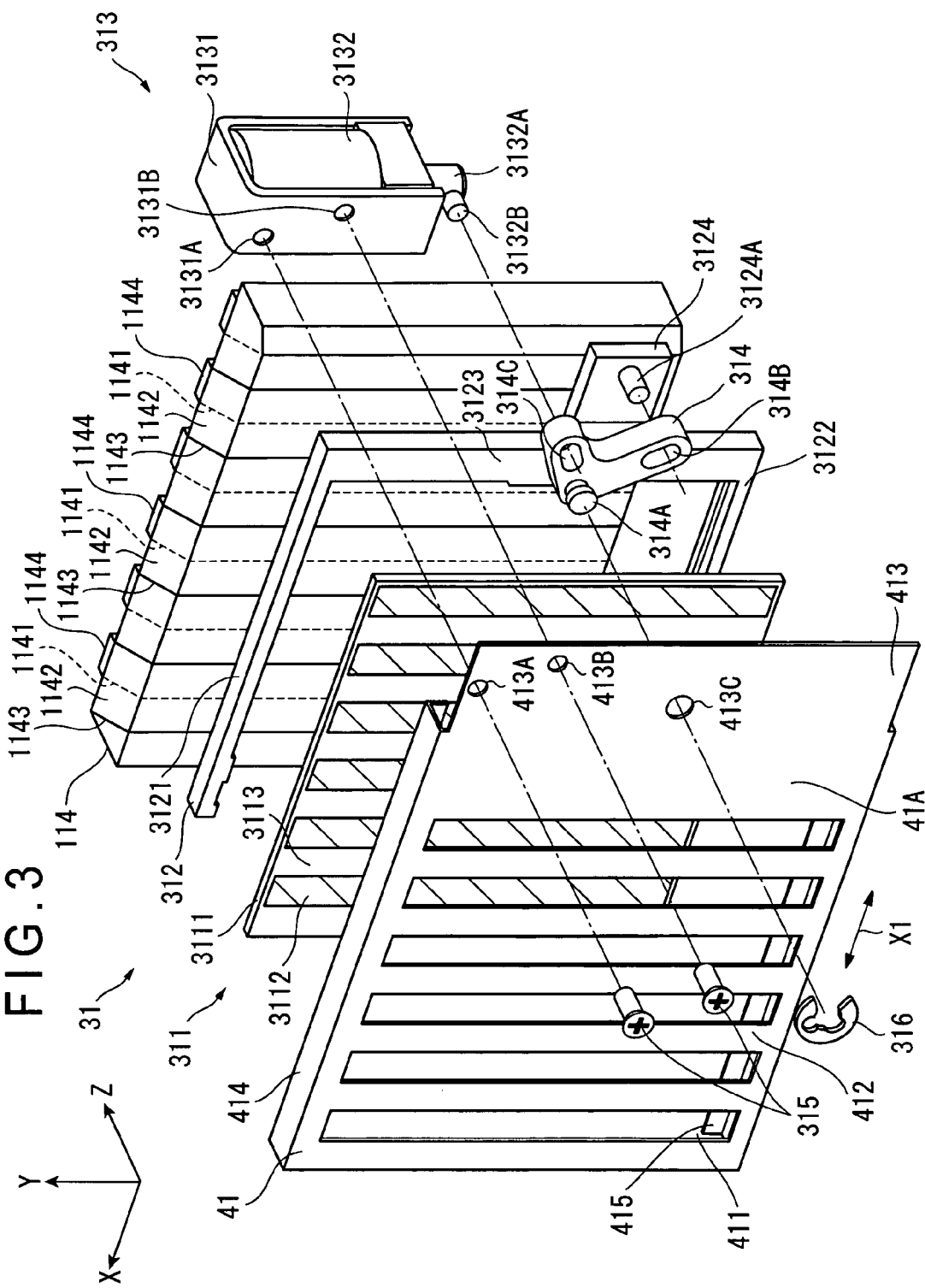
FIG. 3 is an exploded perspective view showing an optical corrector and a mask of the first embodiment.

As shown in FIG. 3, the polarization converter 114 has a plurality of prisms 1142, a plurality of polarization-separating films 1141 and a plurality of reflection films 1143 (light reflection films) respectively formed along the boundaries of the plurality of prisms 1142. In FIG. 3, the polarization-separating films 1141 are indicated by dotted lines for convenience. The polarization-separating films 1141 and the reflection films 1143 are respectively arranged to be inclined to the illumination optical axis (Z-axis). Besides, the polarization-separating films 1141 and the reflection films 1143 are alternately arranged in a direction (X-axial direction) substantially orthogonal to the illumination optical axis. Phase plates 1144 are provided on the surface on the light-irradiation side of the prism 1142 from which the light beam passed through the polarization-separating films 1141 is irradiated, out of the plurality of prisms 1142. The light beam incident on the polarization converter 114 is separated into P polarized light and S polarized light by the polarization-separating film 1141. The separated P polarized light passes through the prism 1142, and is converted into the S polarized light by way of the retardation plate 1144. On the other hand, the S polarized light is reflected by the polarization-separating films 1141 as well as by the reflection films 1143, and irradiated substantially in parallel to the light beam, in which the S polarized light converted from the P polarized light by the retardation plate 1144. Accordingly, the light beam incident on the polarization converter 114 is converted into the substantially uniform polarized light, so that the light utilization efficiency in the optical device 14 can be enhanced.

Referring back to FIG. 2, the respective sub-beams converted into the substantially uniform polarized light by the polarization converter 114 are substantially superposed on the liquid crystal panels 141R, 141G and 141B of the optical device 14 (described below) by the superposing lens 115. Incidentally, such polarization converter 114 is disclosed in, for instance, JP Hei 08-304739A. The polarized light beam irradiated by the polarization converter may be the P polarized light instead of the S polarized light.

The color-separating optical system 12 has two dichroic mirrors 121 and 122, and two reflection mirrors 123 and 124. The plurality of sub-beams irradiated by the integrator illuminating optical system 11 are separated into three-color lights of red (R), green (G) and blue (B) by the two dichroic mirrors 121 (translator's comment: and 122).

The relay optical system 13 has an incident-side lens 131, a relay lens 133, and reflection mirrors 132 and 134. The relay optical system 13 guides the blue light, which is color light separated by the color-separating optical system 12, toward the below-described liquid crystal panel 141B of the optical device 14.

At this time, the dichroic mirror 121 of the color-separating optical system 12 transmits the green light and blue light of the light beam irradiated by the integrator illuminating optical system 11 through the reflection mirror 124, and reflects the red light. The red light reflected by the dichroic mirror 121 is reflected by the reflection mirror 123, which reaches the liquid crystal panel 141 R for red light through a field lens 116. The field lens 116 converts the respective sub-beams irradiated by the second lens array 113 into a light beam parallel to the central axis (main beam) and the field lenses 116 provided on the light-incident side of other liquid crystal panels 141G and 141B function in the same manner.

In the blue and green lights passing through the dichroic mirror 121, the green light is reflected by the dichroic mirror 122, which reaches the liquid crystal panel 141G for green light through the field lens 116. On the other hand, the blue light passes through the dichroic mirror 122, which passes through the relay optical system 13 as well as through the field lens 116 to reach the liquid crystal panel 141B for blue light.

Note that, the relay optical system 13 is used for the blue light in order to avoid deterioration in the light utilization efficiency on account of light dispersion and the like caused by the longer length of the optical path of the blue light than the optical path of other color lights. In other words, the relay optical system 13 is used for directly transmitting the sub-beams incident on the incident-side lens 131 to the field lens 116. Incidentally, though the blue light of the three-color lights passes through the relay optical system 13, the red light, for instance, may alternatively pass through the relay optical system 13.

The optical device 14 modulates the incident light beam in accordance with image information to form a color image. The optical device 14 has three incident-side polarization plates 142 on which the respective color lights separated by the color-separating optical system 12 are incident, three visual-angle corrector plates 143 disposed on the downstream of the respective incident-side polarization plates 142, the liquid crystal panels 141R, 141G and 141B (optical modulators) and irradiation-side polarization plates 144 respectively disposed on the downstream of the visual-angle corrector plates 143, and a cross dichroic prism 145 (color-combining optical device).

The liquid crystal panels 141R, 141G and 141B (optical modulators) use, for instance, a polycrystalline silicon TFT as a switching element, which has a pair of opposing transparent substrates with liquid crystal sealed therebetween. The liquid crystal panels 141R, 141G and 141B irradiate the light beam incident thereon through the incident-side polarization plates 142 and the visual-angle corrector plates 143 after modulating in accordance with image information. Incidentally, the liquid crystal panels 141R, 141G and 141B are held and housed in a holder frame (not shown).

The incident-side polarization plates 142 only transmits a polarized light in a predetermined direction out of the respective color lights separated by the color-separating optical system 12 and absorbs other light beams, which have a substrate made of sapphire glass or the like with a polarization film attached thereon.

The irradiation-side polarization plate 144 is also arranged substantially in the same manner as the incident-side polarization plate 142, which only transmits a polarized light in a predetermined direction out of the light beam irradiated by the liquid crystal panels 141R, 141G and 141B and absorbs other polarized lights, where the polarization axis of the transmitted polarized light is set orthogonal to the polarization axis of the polarized light transmitted through the incident-side polarization plate 142.

The visual-angle corrector plate 143 has a substrate on which an optical conversion film is formed, the optical conversion film correcting the visual angle of the optical image formed by the liquid crystal panels 141R, 141G and 141B. The visual-angle corrector plate 143 compensates a birefringence generated on the liquid crystal panels 141R, 141G and 141B. The visual angle of the projection image is enlarged by the visual-angle corrector plate 143 and the contrast of the projection image is enhanced.

The cross dichroic prism 145 combines the optical image irradiated by the irradiation-side polarization plate 144 and modulated for each color light to form a color image. In the cross dichroic prism 145, a dielectric multi-layer film for reflecting the red light and a dielectric multi-layer film for reflecting the blue light are formed along the boundaries of four right-angle prisms substantially in an X-shape, thus the dielectric multi-layer films combining the three color lights.

The above-described liquid crystal panels 141R, 141G and 141B, the irradiation-side polarization plates 144 and the cross dichroic prism 145 are integrated as a unit.

FIG. 3 shows an exploded perspective view of the optical corrector 31 and the mask 41.

As mentioned above, the optical corrector 31 converts and corrects the light beam irradiated from the second lens array 113 by the optical filter 311 held therein to irradiate the light beam to the polarization converter 114 disposed on the downstream of an optical filter 311. As shown in FIG. 3, the optical corrector 31 includes the optical filter 311, a holder 312 for holding the optical filter 311 and a filter-driving mechanism 313 equipped with a lever 314. The holder 312 moves along guides 414 and 415 of the mask 41 in arrowed X1 direction (±X-axial direction), or in the direction in which the above-described polarization-separating films 1141 and below-described openings 411 are arranged.

As shown in FIG. 3, the mask 41, which serves as a light shield for blocking a part of the light incident on the polarization converter 114, is disposed on the upstream of the optical filter 311. The mask 41 may guide the movement of the holder 312 provided with the optical corrector 31. The mask 41 is a substantially rectangular stainless-steel component seen in the light-incident direction. Additionally, the mask 41 includes the six slit-like openings 411, a shield portion 412 not transmitting the incident light, an extended portion 413 and the guides 414 and 415.

The openings 411 and the shield portion 412 are formed in a plane parallel to the XY plane and alternately arranged.

The openings 411 are rectangular openings elongated in vertical direction (Y-axial direction), forming an optical path so that the light beam enters the polarization-separating films 1141 of the polarization converter 114. The openings 411 are formed corresponding to the polarization-separating films 1141.

The shield portion 412 is a part that blocks the light beam to directly enter the reflection films 1143 of the polarization converter 114, thus being formed corresponding to the reflection films 1143 of the polarization converter 114.

With this configuration, the light beam passed through the openings 411 enters the polarization-separating films 114 (translator's comment: correctly, 1141) of the polarization converter 114. In contrast, the light beam entering the shield portion 412 does not pass through the mask 41, and consequently, the light beam would not enter the reflection films 1143 of the polarization converter 114. Accordingly, since the light beam can be prevented from directly entering the reflection films 1143, the light beam can avoid the polarized light of the different types mixing to the light beam irradiated by the polarization converter 114.

The extended portion 413 is formed extending from an end of the mask 41 in the width direction thereof in the plane parallel to the XY plane. Holes 413A, 413B and 413C are formed around the upper end or at the substantially center of the extended portion 413. The filter-driving mechanism 313 is attached to the holes 413A and 413B on the rear side of the extended portion 413 by way of screws 315. On the other hand, the lever 314 of the filter-driving mechanism 313 is attached to the hole 413C.

The guides 414 and 415 are formed on a surface 41B (see FIGS. 4 and 5) on the light-irradiation side of the mask 41. The guides 414 and 415 guide the holder 312 moving in the arrowed X1 direction.

The guide 414 extends from the upper end of the surface 41B substantially in parallel to the illumination optical axis (Z-axial direction), and an end of the extending part thereof extends substantially vertically downward, i.e., stands in −Y-axial direction. The guide 415 extends from the lower end of the surface 41B substantially in parallel to the illumination optical axis (Z-axial direction), and an end of the extending part thereof extends substantially vertically upward (+Y-axial direction).

With the above arrangement, the guides 414 and 415 support the holder 312 by sandwiching the upper and lower ends of the holder 312, and guide the holder 312 moving in the arrowed XI direction, or in the direction in which the openings 411 (±X-axial direction) are arranged.

The optical filter 311 of the optical corrector 31 optically converts the incident light beam. The optical filter 311 has a board 3111 made of light transmissive glass, on which six converting sections 3112 and six non-converting sections 3113 respectively vertically elongated are formed. A filtering film is deposited on each of the converting sections 3112. On the other hand, no filtering film is deposited on the non-converting sections 3113. Additionally, an antireflection film is formed on the back side of the board 3111. The board 3111 may alternatively be made of light transmissive synthetic resin or the like.

The converting sections 3112 are formed striped with the pitch thereof corresponding to the arrangement of the polarization-separating films 1141 of the polarization converter 114, and the width being substantially the same as the width of the pitch of the opening 411. That is, the dimension of the converting section 3112 in the X-axial direction is formed to be the substantially same as that of the opening 411 of the mask 41 in the X-axial direction. The vertical dimension (in the Y-axial direction) of the converting section 3112 is formed to be the substantially same as or larger than the vertical dimension (in the Y-axial direction) of the opening 411. Specifically, the converting section 3112 formed on the board 3111, the polarization-separating film 1141 of the polarization converter 114 and the opening 411 formed on the mask 41 are mutually correlated. When the openings 411 formed on the mask 41 and the converting sections 3112 are superposed, and the light beam enters the optical corrector 31, nearly all of the light beam incident on the respective openings 411 enters the converting sections 3112, and the light beam passed through the converting sections 3112 then enters the polarization-separating films 1141. Note that, the structure of the converting section 3112 will be described below in detail.

The holder 312 as a holder frame is a component for holding the optical filter 311 by fitting thereinto. The holder 312 extending in the horizontal direction (in +X-axial direction relative to a vertical beam 3123) has two horizontal beams 3121 and 3122 arranged substantially in parallel each other as well as a vertical beam 3123 coupling respective ends of the two horizontal beams 3121 and 3122 in the Y-axial direction so as to be formed in a substantially U-shape. A substantially rectangular plate 3124 is attached to the rear side, i.e., at the substantially center of the surface on the light-irradiation side of the vertical beam 3123, so as to be extending in a direction opposite to the horizontal beams 3121 and 3122 (in −X-axial direction relative to the vertical beam 3123). A protrusion 3124A is formed projecting from the surface on the light-incident side of the plate 3124 in an out-plane direction. The protrusion 3124A engages with the lever 314.

The filter-driving mechanism 313 moves the holder 312 with the optical filter 311 attached, the filter-driving mechanism 313 being attached to the surface 41B on the light-irradiation side of the mask 41. The filter-driving mechanism 313 includes a case 3131, a drive unit 3132 and the lever 314.

The case 3131 is a metal component that protects the drive unit 3132 housed therein and attaches the filter-driving mechanism 313 to the mask 41. Two holes 3131A and 3131B are formed on the case 3131, so that the above-described screws 315 are inserted to the two holes 3131A and 3131B as the filter-driving mechanism 313 is attached to the mask 41.

The drive unit 3132 is constituted of a solenoid. A shaft 3132A provided so as to project and retroject from the lower end of the drive unit 3132 projects and retrojects in response to application of the voltage. A protrusion 3132B is formed on the lateral side of the shaft 3132A to engage with the lever 314.

The lever 314 as a cam rotates according to the projection and retrojection of the shaft 3132A of the drive unit 3132 to move the holder 312, the lever 314 being formed in a substantially L-shape with its lateral part being gently curved. Provided on the lever 314 are a protrusion 314A formed substantially at the center of the lever 314, an elongated hole 314B formed on the longitudinal end of the lever 314 and an elongated hole 314C formed on the end of the shorter side of the lever 314.

The protrusion 314A is a rotary shaft of the lever 314. After inserting the tip end of the protrusion 314A to the hole 413C, a C-shaped ring 316 is fitted between the surface on the light-irradiation side of the protrusion 314A and the surface 41A on the light-incident side of the mask 41, so that the lever 314 is attached to the mask 41 rotatably around the protrusion 314A.

The protrusion 3124A projected on the plate 3124 of the holder 312 is inserted to the elongated hole 314B. Additionally, the protrusion 3132B projected on the shaft 3132A of the drive unit 3132 is inserted to the elongated hole 314C.

An assembly method of the optical corrector 31 will be described below.

First, the protrusion 314A of the lever 314 provided with the filter-driving mechanism 313 is inserted to the hole 413C formed on the extended part 413 of the mask 41, and the lever 314 is rotatably attached to the mask 41 by way of the C-shaped ring 316. The optical filter 311 is then fixed to the horizontal beams 3121 and 3122 as well as the vertical beam 3123 of the holder 312. Thereafter, the holder 312 is held by the guides 414 and 415 of the mask 41 with sandwiched therebetween. At this time, the holder 312 is arranged so that the protrusion 3124A formed on the plate 3124 of the holder 312 is inserted to the elongated hole 314B of the lever 314. Lastly, the filter-driving mechanism 313 is fixed to the extended portion 413 by the screws 315 so that the protrusion 3132B formed on the shaft 3132A is inserted to the elongated hole 314C of the lever 314. With the above assembling, the optical corrector 31 is attached to the mask 41.

A moving mechanism of the holder 312 will be described below.

Figure 4:
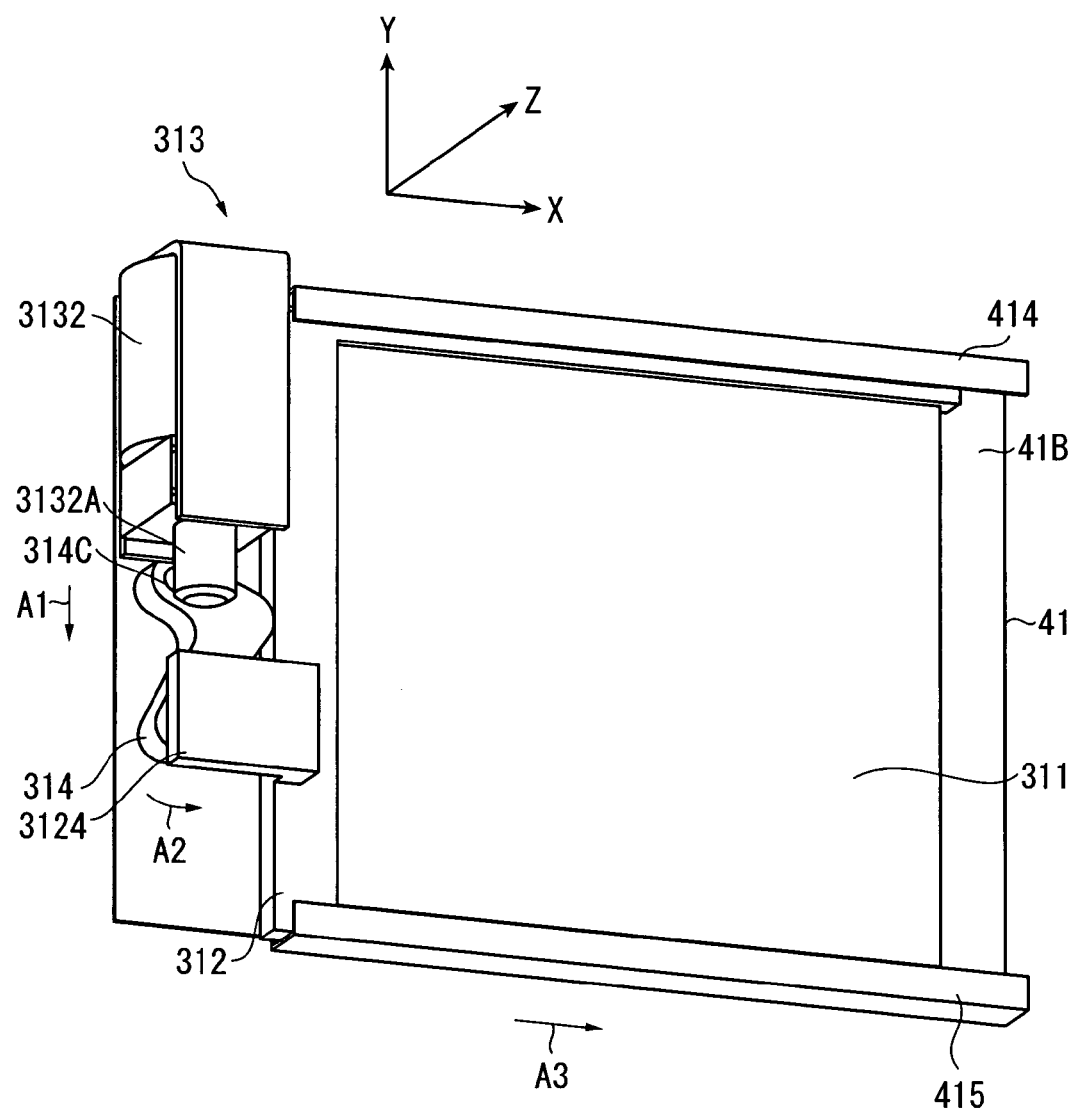
FIG. 4 is a perspective view showing the rear side (light-irradiation side) of the optical corrector of the first embodiment.
Figure 5:
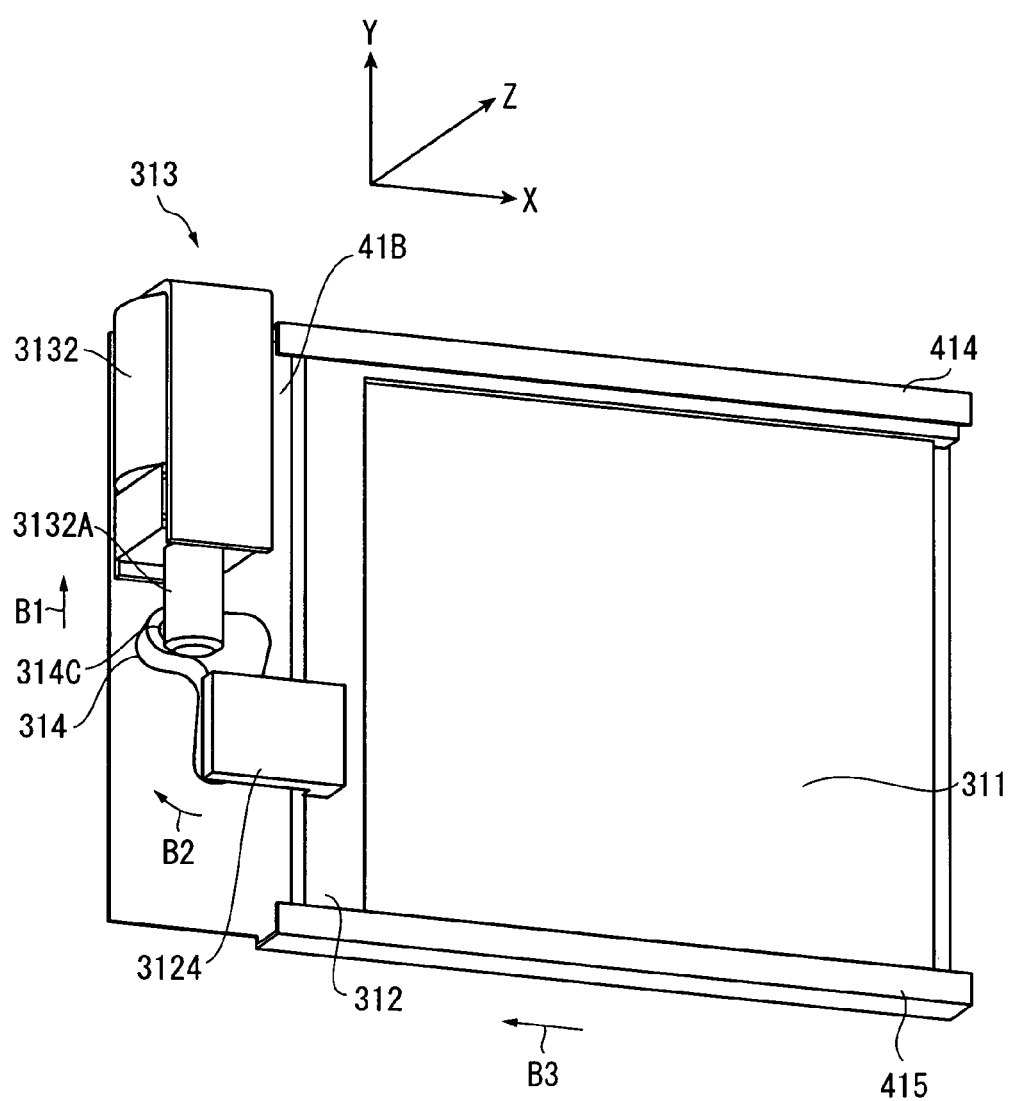
FIG. 5 is a perspective view showing the rear side (light-irradiation side) of the optical corrector of the first embodiment.

FIGS. 4 and 5 are perspective views each showing the optical corrector 31 and the mask 41 seen from the rear side thereof (light-irradiation side). FIG. 4 particularly shows the optical corrector 31 in the case that the positions of the openings 411 of the mask 41, that of the converting sections 3112 of the optical filter 31 and that of the polarization-separating films 1141 of the polarization converter 114 are not relatively consisted with each other. On the other hand, FIG. 5 particularly shows the optical corrector 31 in the case that the positions of the openings 411, that of the converting sections 3112 and that of the polarization-separating films 1141 are relatively consisted with each other.

First, the movement of the holder 312 will be described below when correcting the incident light beam, in other words, when the positions of the converting sections 3112 of the optical filter 311, that of the openings 411 of the mask 41, and that of the polarization-separating films 1141 of the polarization converter 114 are relatively consisted with each other.

Referring to FIG. 4, the shaft 3132A provided on the drive unit 3132 of the filter-driving mechanism 313 projects downward (in −Y-axial direction), i.e., in arrowed Al direction from the end of the drive unit 3132. The shaft 3132A is projected in response to the voltage applied on the drive unit 3132, the voltage being applied by a controller 7 (see FIG. 8) provided on a control board (not shown) disposed inside the projector. The shaft 3132A engages with the elongated hole 314C of the lever 314 through the protrusion 3132B formed on the end of the shaft 3132A whereas the lever 314 is rotatably attached around the protrusion 314A. Thus, the protrusion of the shaft 3132A allows the lever 314 to rotate in arrowed A2 direction. This rotation pushes the holder 312 to move in arrowed A3 direction (in +X-axial direction) along the guides 414 and 415 formed on the mask 41, through the protrusion 3124A engaging with the elongated hole 314B of the lever 314. At this time, the moving amount of the holder 312 corresponding to the maximum protrusion of the shaft 3132A is set to be the substantially same as the width of pitch (dimension in the X-axial direction) of the converting section 3112 formed on the optical filter 311. Accordingly, since the holder 312 is moved in the arrowed A3 direction by the protrusion of the shaft 3132A, the relative positions of the converting sections 3112 of the optical filter 311, that of the openings 411 formed on the mask 41 and that of the polarization-separating films 1141 of the polarization converter 114 are consisted with each other.

Next, the movement of the holder 312 will be described below when not correcting the incident light beam, in other words, when the positions of the converting sections 3112 of the optical filter 311, that of the openings 411 of the mask 41, and that of the polarization-separating films 1141 of the polarization converter 114 are not consisted with each other. This reverses the moving operation of the holder 312 in the case that the incident light beam is corrected as described above.

In FIG. 5, the shaft 3132A remaining to project from the lower end of the drive unit 3132 of the filter-driving mechanism 313 retrojects in arrowed B1 direction (+Y-axial direction) in response to application of the voltage. Thus, the lever 314 is rotated in the arrowed B2 direction. This rotation of the lever 314 pulls the plate 3124 to move the holder 312 in the arrowed B3 direction (−X-axial direction) through the protrusion 3124A engaging with the lever 314. As mentioned above, the maximum protrusion of the shaft 3132A corresponds to the movement of the holder 312 for the width of pitch (dimension in the X-axial direction). Accordingly, the positions of the openings 411 of the mask 41, that of the converting sections 3112 of the optical filter 311 and that of the polarization-separating films 1141 of the polarization converter 114, which are consisted with each other before the holder 312 is moved, is no longer consisted with each other on account of the movement of the holder 312.

Figure 6:
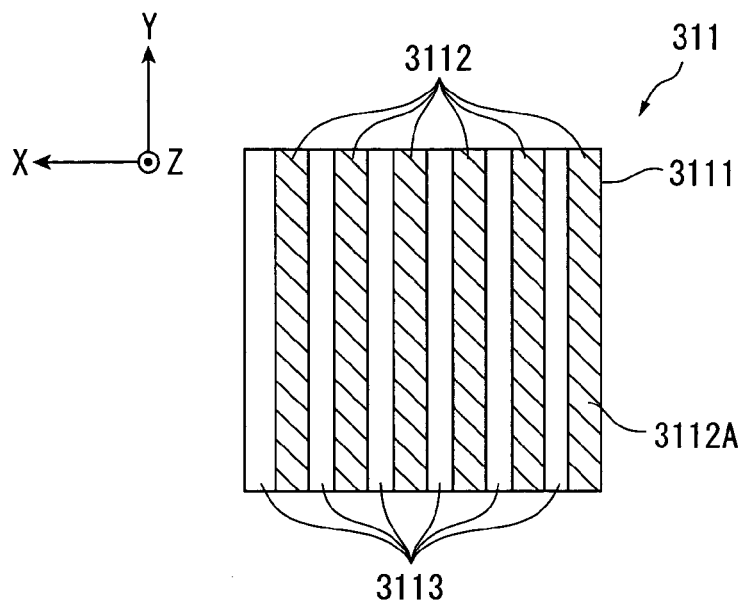
FIG. 6 is an illustration schematically showing a pattern of filtering films of an optical filter of the first embodiment.

Referring to FIG. 6, a pattern of the filtering films formed on the converting sections 3112 of the optical filter 311 is shown.

As shown in FIG. 6, the six converting sections 3112 and the six non-converting sections 3113 are respectively formed on the board 3111 of the optical filter 311 alternately, the number of either the converting sections 3112 or that of the non-converting sections 3113 corresponding to the number of incident sections (translator's comment correctly, the openings) 411 formed on the mask 41. The filtering film 3112A (shaded portion in FIG. 6) that converts and then transmits the incident light beam is substantially entirely formed on each of the converting sections 3112. When the holder 312 holding the optical filter 311 is moved so that the light beam incident on the openings 411 of the mask 41 enters the converting sections 3112, the optical filter 311 serves as a filter that converts substantially all of the incident light beam.

Figure 7:
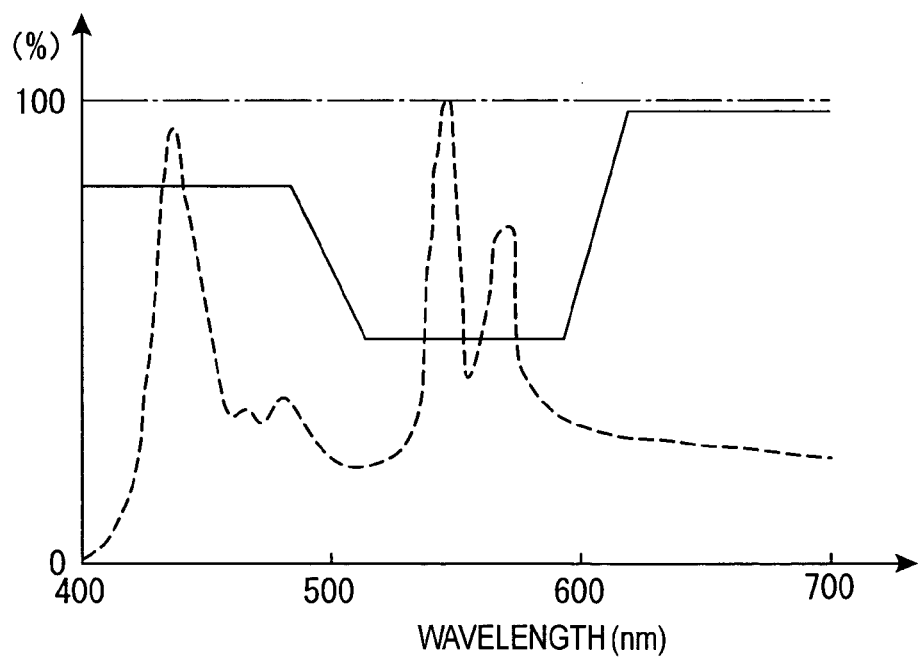
FIG. 7 is a graph showing transmittance property of the filtering film and spectrum intensity of a light source lamp of the first embodiment.

In FIG. 7, transmittance property (solid line) of the filtering film 3112A and spectrum intensity (dotted line) of the light source lamp 117 of the first embodiment are shown. The conversion of the light beam according to the first embodiment allows the color tone of the optical image formed by the optical unit 1 to be adjusted by reducing the transmittance of a predetermined wavelength of the incident light beam (light beam irradiated by the light source lamp 117).

As shown in FIG. 7, the filtering film 3112A restricts the transmittance of the incident light beam (light beam irradiated by the light source lamp 117), mainly within the wavelength range of green light (range of approximately 500 nm to 580 nm), by nearly half. The transmittance of the light, mainly within the wavelength range of blue light (range of approximately 430 nm to 50 nm), is reduced by approximately 20%. In contrast, almost all of the light, mainly within the wavelength range of red light (range of approximately 590 nm to 700 nm) is transmitted.

Though not shown, the filtering film 3112A is formed as an optical conversion layer constituted by a dielectric multilayer film, in which a high refractive layer and a low refractive layer, i.e., thin films of two different kinds having different refractive indexes, are alternately layered on the board 3111. As the composition of the respective layers, the high refractive layer is made of tantalum pentoxide ($Ta_2O_5$) while the low refractive layer is made of silicon dioxide ($SiO_2$).

Now, the pattern of the arrangement shown in FIG. 6 as well as the optical corrector 31 with the optical filter 311 formed by combining the filtering films 3112A having the transmittance property as shown in FIG. 7 will be described below.

In the optical corrector 31, when the positions of the openings 411 of the mask 41, that of the converting sections 3112 of the optical filter 311 and that of the polarization-separating films 1141 of the polarization converter 114 are relatively consisted with each other, the transmittance of the green light out of the incident light beam is largely reduced as well as that of the blue light. The transmitting light beam, the color tone of which is corrected, is used by the optical unit 1 forming the optical image, so as to form the high-saturation image. Further, when the positions of the non-converting sections 3113 of the optical filter 311, that of the openings 411 of the mask 41 and that of the polarization-separating films 1141 of the polarization converter 114 are relatively consisted with each other, and the light beam enters the optical corrector 31, the incident light beam would not be corrected. Therefore, nearly all of the light beam irradiated by the light source device 111 are used by the optical unit 1 forming the optical image, thus forming the high-luminance image.

Figure 8:
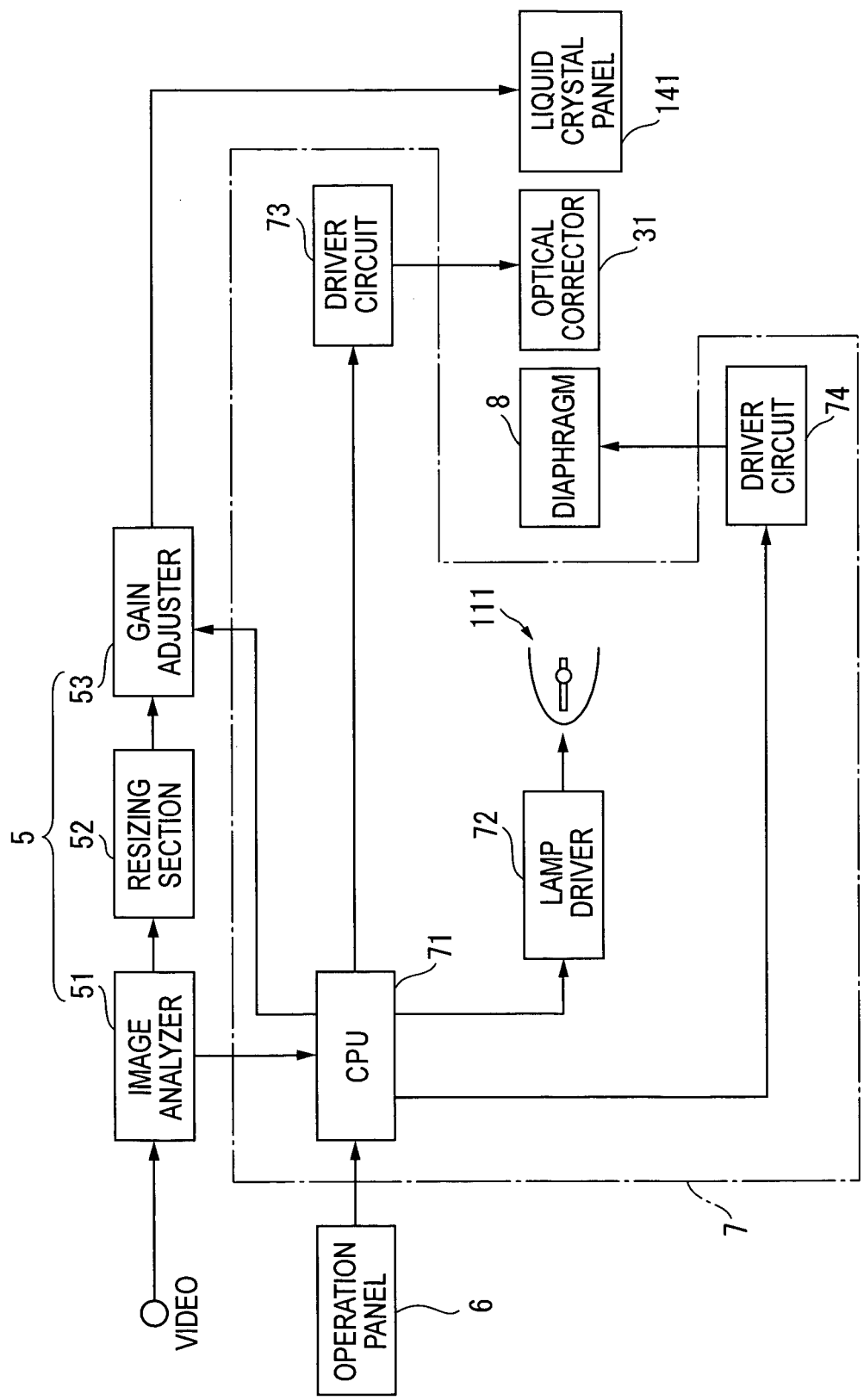
FIG. 8 is a conceptual block diagram showing the circuitry of a control system built into the projector of the first embodiment.

FIG. 8 is a conceptual block diagram showing the circuitry of a control system built into the projector 10.

As shown in FIG. 8, the projector 10 includes an input signal converter 5, the operation panel 6, the controller 7 and a diaphragm 8.

The input signal converter 5 processes a video signal sent from a video input terminal to output the processed signal to the liquid crystal panel 141 of the optical unit 1, the input signal converter 5 including an image analyzer 51, a resizing section 52 and a gain adjuster 53.

The image analyzer 51 is a circuit that extracts luminance information related to the luminance distribution of image to output the extracted information to the controller 7. Specifically, the image analyzer 51 can be constituted by, for example, a peak hold circuit in which a reset operation is conducted by a frame basis. In this case, the maximum value of the luminance is output per a screen.

The resizing section 52 is a resolution converter circuit that converts the resolution of input image in accordance with the number of pixels of the liquid crystal panel 141.

The gain adjuster 53 adjusts a luminance signal in accordance with the intensity of the illumination light irradiated by the light source device 111, the gain adjuster 53 adjusting the luminance of the formed optical image by cooperating with the light source device 111.

As described above, the operation panel 6 is a panel provided with the plurality of switches 6A (see FIG. 1) for actuating and adjusting the projector 10. These switches 6A, which is electrically connected to the controller 7, transmits a predetermined pulse signal to the controller 7 once the predetermined switch 6A is turned on.

The controller 7 is provided on the control board (not shown) that controllably driving the entire projector 10, the controller 7 including a power conditioning mechanism of the present invention. The controller 7 adjusts the luminance of the light source lamp 117 of the light source lamp 111 and also controllably drives the optical corrector 31 and the diaphragm 8, the controller 7 including a CPU 71, a lamp driver 72 and driver circuits 73 and 74.

The CPU 71 as a control unit controls electric power supply to the light source lamp 117 as well as driving of the optical corrector 31 and the diaphragm 8. The CPU 71 outputs predetermined pulse signals to the lamp driver 72 driving the light source lamp 117, the driver circuit 73 driving the optical corrector 31 and the driver circuit 74 driving the diaphragm 8, based on the luminance information sent from the image analyzer 51 of the input signal converter 5 and the pulse signal sent from the operation panel 6.

The lamp driver 72 converts direct current input from the power source unit (not shown) into alternating current with rectangular wave to light the light source lamp 117. Though not shown, the lamp driver 72 includes a step-down chopper, an inverter bridge and an igniter.

The step-down chopper is a voltage step-down circuit that decreases the direct-current voltage of approximately 300 to 400V, to the voltage of approximately 50 to 150V, which is appropriate for lighting the light source lamp 117.

The inverter bridge converts direct current into alternating current with rectangular wave, and is constituted as a bridge circuit including two pairs of transistors. The light source lamp 117 is connected between the transistors.

The igniter, which is a circuit that performs dielectric breakdown between the electrodes of the light source lamp 117 to urge the light source lamp 117 starting, is connected between an ignition device including the step-down chopper as well as the inverter bridge, and the light source lamp 117 to be parallel to the light source lamp 117.

The driver circuit 73 is a circuit that instructs the optical corrector 31 to drive. The driver circuit 73 moves the holder 312 that holds the optical filter 311 by applying the voltage to the filter-driving mechanism 313 of the optical corrector 31 based on the pulse signal sent from the CPU 71, to switch between the case that the incident light beam irradiated from the light source device 111 is corrected and the case that the light beam is not corrected.

The driver circuit 74 is a circuit that instructs the diaphragm 8 to drive. The driver circuit 74 supplies electric power to the diaphragm 8 based on the pulse signal sent form the CPU 71, allows the diaphragm 8 disposed on an optical path of the illumination light beam irradiated by the light source device 111 to drive, and adjusts the luminance by reducing the amount of the light beam transmitted through the diaphragm 8.

The power conditioning mechanism of the light source lamp 117 under the control of the controller 7 is operated by the CPU 71 controlling the lamp driver 72. Specifically, when the light source lamp 117 is lit in low-luminance mode according to the pulse signal sent from the operation panel 6, the CPU 71 outputs the pulse signal to the step-down chopper of the lamp driver 72, allows a part of the direct current, which inputs the step-down chopper, to flow to the ground, and supplies electric power, the amount of which is less than the rated current, to the light source lamp 117. On the other hand, when the light source lamp 117 is lit in high-luminance mode, the CPU 71 outputs the pulse signal to the step-down chopper and supplies the rated current to the light source lamp 117 to be lit. With this configuration, the amount of the light beam emitted by the light source lamp 117 is adjusted, and the luminance of the optical image is adjusted as well.

Figure 9:
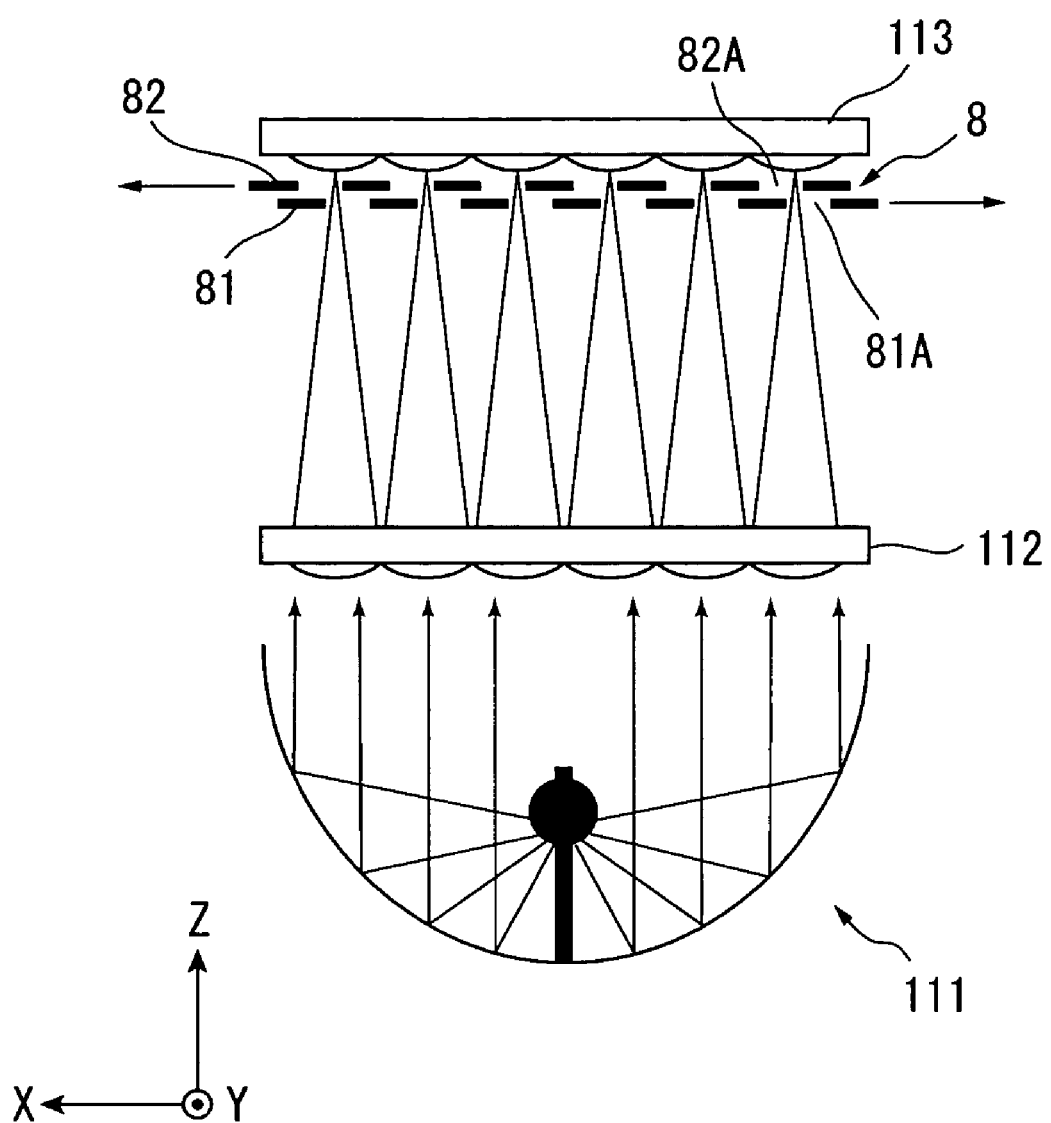
FIG. 9 is an illustration schematically showing a diaphragm of the first embodiment.

FIG. 9 is an illustration schematically showing the diaphragm 8.

The diaphragm 8 corresponds to a diaphragm mechanism of the present invention, which is arranged between the first lens array 112 and the second lens array 113 against the optical axis of the light beam irradiated by the first lens array 112, the diaphragm 8 adjusting the luminance of the optical image formed by the optical unit I by reducing the amount of the transmitting light beam. As shown in FIG. 9, the diaphragm 8 includes slit plates 81 and 82 moving in mutually opposite direction along the X-axis, and a drive mechanism (not shown) that drives the slit plates 81 and 82 moving.

The slit plates 81 and 82 are stainless-steel components arranged substantially in parallel to each other as well as the XY-plane. The slit plates 81 and 82 can adjust the amount of the transmitting light beam by moving in mutually opposite directions along the X-axis to partially block the incident light beam. A plurality of slit-like openings 81A and 82A, which are rectangular shapes elongated in the height direction (Y-axial direction) seen from the light-incident direction (light-incident side), are formed at specified intervals. The openings 81A and 82A are formed at the focal positions of the light beam irradiated by the first lens array 112 so as to respectively have the substantially same areas. The openings 81A and 82A generally overlap with each other, by which the optical path of the light beam is secured. If the slit plates 81 and 82 moves in mutually opposite directions by way of the drive unit, the optical path of the light beam secured because of the overlap of the openings 81A and 82A would be narrowed. Accordingly, the amount of the transmitting light beam is reduced as compared to that of the light beam incident on the diaphragm 8.

According to the first embodiment of the present invention, following advantages can be obtained.

(1-1) The filtering films 3112A of the optical filter 311 restricts the transmittance of the incident light beam (light beam irradiated by the light source lamp 117) within the wavelength range of green light, by nearly half. Additionally, the transmittance of the light within the wavelength range of blue light, is reduced by approximately 20%. Accordingly, since the position of the openings 411 of the mask 41 and that of the converting sections 3112 of the optical filter 311 are relatively consisted with each other, and besides, the filtering films 3112A are set on the optical path of the illumination light beam, the color tone of the optical image formed on the basis of the input video signal can be corrected so that the optical image is sharpened. In particular, pure white color can be projected but not greenish-white. Thus, the high-saturation image can be formed and projected for the purpose of home theaters or the like, and the visibility of the projection image can be enhanced.

(1-2) The converting sections 3112 are formed on the optical filter 311 in a striped manner with the pitch thereof corresponding to the arrangement of the polarization-separating films 1141 of the polarization converter 114, and the width (dimension in the X-axial direction) being substantially the same as the width of the openings 411 of the mask 41. Since the filter-driving mechanism 313 moves the holder 312, the converting sections 3112 or the non-converting sections 3113 of the optical filter 311 are arranged so as to correspond to the openings 411 as well as to the polarization-separating films 1141. With this arrangement, the movement of the optical filter 311 by the filter-driving mechanism 313 allows the positions of the converting sections 3112 or the non-converting sections 3113 formed on the optical filter 311 to relatively correspond to the positions of the openings 411 of the mask 41 and the polarization-separating films 1141 of the polarization converter 114. When the positions of the openings 411, that of the polarization-separating films 1141 and that of the converting sections 3112 are consisted with each other, the optical image can be formed with the use of the illumination light beam the color tone of which is corrected by the filtering films 3112A, thus realizing the high-saturated projection image. On the other hand, when the positions of the openings 411, that of the polarization-separating films 1141 and that of the non-converting sections 3113 are consisted with each other, the optical image can be formed with the use of the illumination light beam the color tone of which is not corrected, thus realizing the high-luminance projection image. That is, by setting and unsetting the converting sections 3112 against the optical path of the illumination light beam, the projection image can be shift as necessary.

(1-3) The moving amount of the optical filter 311 by the filter-driving mechanism 313 is predefined to be the substantially same as the width of the pitch (dimension in the X-axial direction) of the converting section 3112 formed on the optical filter 311. Further, the width of the pitch (dimension in the X-axial direction) of the converting section 3112 corresponds to the width of the pitch (dimension in the X-axial direction) of the polarization-separating film 1141 of the polarization converter 114 as well as to the width of the pitch (dimension in the X-axial direction) of the opening 411 formed on the mask 41. With this arrangement, the optical filter 311 is only required to be moved by the width of the pitch (dimension in the X-axial direction) of the polarization-separating film 1141 of the polarization converter 114, i.e., the width of the pitch (dimension in the X-axial direction) of the opening 411 of the mask 41, in order to switch between the case converting the incident light beam and the case not converting. Thus, the moving amount of the optical filter 311 can be minimized. Additionally, the dimensions of the optical corrector 31 occupying in the projector 10 can also be minimized, thereby downsizing the projector 10 as well as enhancing the flexibility on the layout of the optical system of the optical unit 1.

(1-4) The drive unit 3132 of the filter-driving mechanism 313 is constituted of a solenoid provided with the shaft 3132A and the lever 314. The projection and retrojection of the shaft 3132A of the drive unit 3132 is controlled due to the application of the voltage by the controller 7. With this arrangement, the application of the voltage on the drive unit 3132 allows the optical filter 311 to move stepwise, so that the setting and unsetting of the converting sections 3112 against the illumination optical axis can be switched instantly. Thus, the above setting and unsetting can switch between the case converting the incident light beam and the case not converting that, thereby simplifying the structure of the optical corrector 31.

(1-5) The controller 7 regulates the power condition of the light source device 111 as the power conditioning mechanism for the light source device 111 in order to adjust the luminance of the light beam irradiated by the light source lamp 117. With this arrangement, when the optical image projected is requested to be high-luminance image, the rated current is supplied to the light source lamp 117 to realize the high-luminance display. In contrast, when the optical image is requested to be low-luminance image, the supplying current is reduced as compared to the rated current to realize the low-luminance display. Accordingly, the range of the luminance of the optical image projected can be extended, while the projector 10 requires less electricity consumption at the display mode of the low-luminance.

(1-6) The projector 10 is provided with the diaphragm 8 controllably driven by the controller 7. The diaphragm 8 can adjust the luminance of the optical image to be formed. Note that, since the luminance adjustment on account of the diaphragm 8 is carried out by reducing the amount of the transmitting light beam irradiated by the light source lamp 117, it is independent from the above mentioned luminance adjustment due to the power conditioning. Accordingly, the range of the luminance of the light beam can further be extended and the adjustment of the projection image can further be finely adjusted in addition to the function of the power conditioning mechanism of the light source device 111.

(2) Second Embodiment

Next, a projector according to a second embodiment of the present invention will be described below. The second embodiment differs from the first embodiment in the structure of the optical corrector as described below. Other structures are the same as the first embodiment. Incidentally, in the following description, the same reference numerals will be attached to the same or substantially the same components as the above-described components to omit the description thereof.

Figure 10:
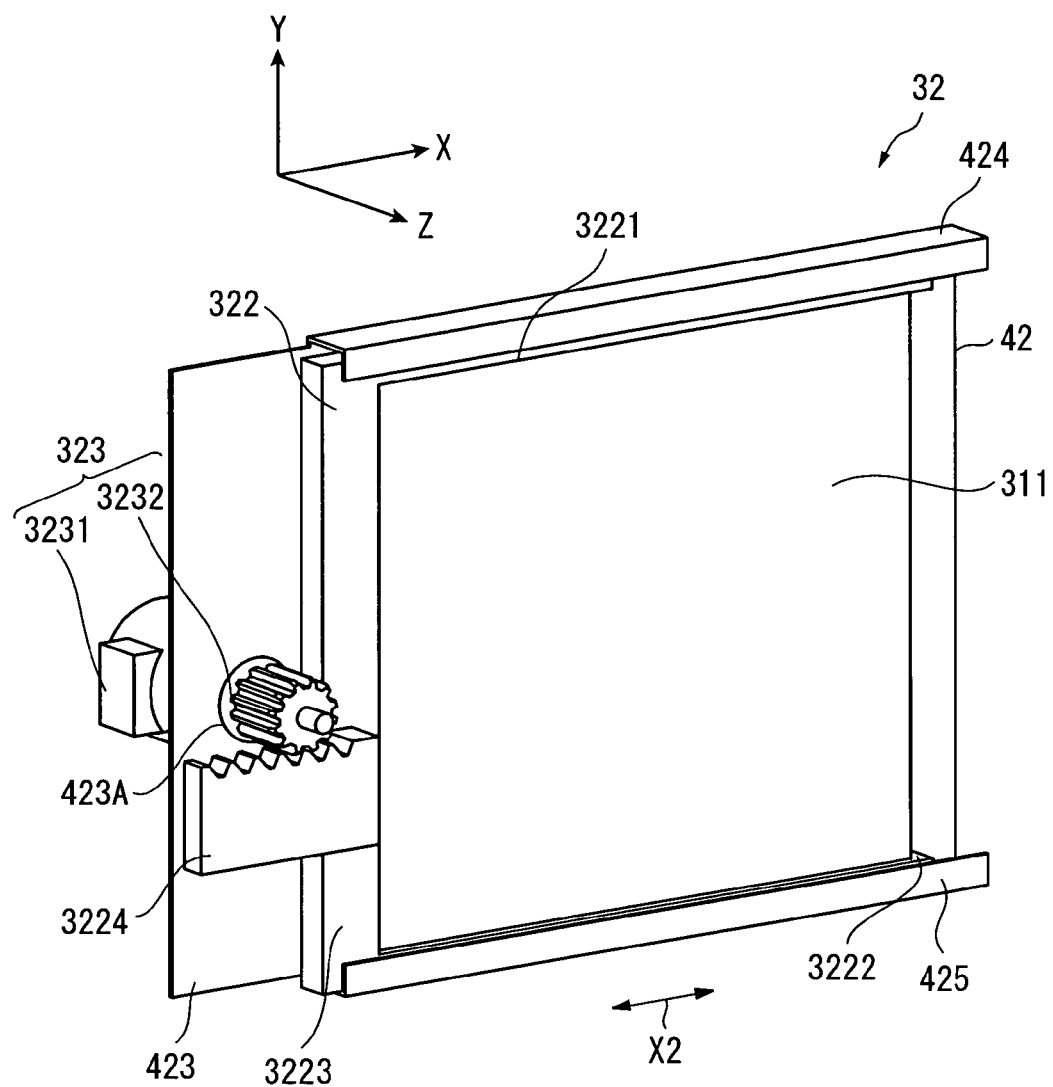
FIG. 10 is a perspective view showing the rear side (light-irradiation side) of an optical corrector according to a second embodiment.

FIG. 10 is a perspective view showing an optical corrector 32 and a mask 42 seen from the rear side (light-irradiation side).

As shown in FIG. 10, the projector according to the second embodiment includes the mask 42 and the optical corrector 32, the optical corrector 32 including the optical filter 311, a holder 322 and a filter-driving mechanism 323.

The mask 42 is arranged on the upstream of the optical filter 311 in the same manner as the mask 41 of the first embodiment, which is a substantially rectangular stainless-steel including the function guiding the movement of the holder 322. The mask 42 includes slit-like openings, a shield portion that blocks the incident light beam, an extended portion 423 and guides 424 and 425 in the same manner as the mask 41 of the first embodiment. Incidentally, since the openings, the shield portion and the guides 424 and 425 have the same structure as the mask 41, the description will be omitted.

The extended portion 423 is formed extending from an end of the mask 42 in the width direction in the plane parallel to the XY plane. A hole 423A is formed at the substantially center of the extended portion 423, and the filter-driving mechanism 323 is attached using the hole 423A.

The holder 322 is a component for holding the optical filter 311 by fitting in the same manner as the holder 312 of the first embodiment, the holder 322 moving by way of the filter-driving mechanism 323 along the guides 424 and 425. The holder 322 extending in the horizontal direction (in +X-axial direction relative to the vertical beam 3223) has two horizontal beams 3221 and 3222 arranged substantially in parallel to each other as well as a vertical beam 3223 coupling respective ends of the two horizontal beams 3221 and 3222 in the substantially vertical direction (in Y-axial direction) so as to be formed in a substantially U-shape. Additionally, the holder 322 has a rack 3224. The rack 3224 extends from the substantially center of the rear side (light-irradiation side) of the vertical beam 3223 in parallel but opposite to the extending direction of the horizontal beams 3221 and 3222 (i.e., in −X-axial direction relative to the vertical beam 3223), to engage with the filter-driving mechanism 323.

The filter-driving mechanism 323 moves the holder 322, to which the optical filter 311 is attached, along the guides 424 and 425 of the mask 42 in the arrowed X2 direction (±X-axial direction), or the direction in which the polarization-separating films and the openings are arranged, in the same manner as the filter-driving mechanism 313 of the first embodiment. The filter-driving mechanism 323 includes a motor 3231 and a pinion 3232. The motor 3231, which generates driving force for moving the holder 322, may employ a stepping motor or the like. The rotary shaft of the motor 3231 is inserted to the hole 423A of the mask 42 in the same direction as the light-incident direction (Z-axial direction), the pinion 3232 being attached to the end of the rotary shaft. In other words, the motor 3231 arranged on the light-incident side of the mask 42 and the pinion 3232 arranged on the light-irradiation side thereof sandwich the extended portion 423 of the mask 42. The pinion 3232 comes into occlusion with the rack 3224 provided on the holder 322, so that the driving force generated at the motor 3231 is transferred to the holder 322 via the rack 3224.

Now, the movement of the optical filter 311 by the filter-driving mechanism 323 of the optical corrector 32 will be described below.

The motor 3231 of the filter-driving mechanism 323 is controllably driven by the controller 7 (see FIG. 8) in the same manner as the optical corrector 31 of the first embodiment. Namely, the driving of the motor 3231 as well as the rotary direction of the rotary shaft are controlled by the pulse signal output from the controller 7. The motor 3231, to which the pulse signal is input from the controller 7, rotates the pinion 3232 via the rotary shaft provided at the motor 3231. The pinion 3232 comes into occlusion with the rack 3224 formed on the holder 322, and the holder 322 is held by the guides 424 and 425 formed on the mask 42, so that the rotation of the pinion 3232 enables the holder 322 to move in the arrowed X2 direction (±X-axial direction) along the guides 424 and 425. Note that, the moving amount of the holder 322 due to the drive of the motor 3231 is so predefined that the converting sections 3112 or the non-converting sections 3113 of the optical filter 311 are switched to relatively be consisted with each other.

According to the second embodiment, following advantages can be obtained as well as the same advantages as the above-described (1-1) to (1-3), (1-5) and (1-6).

(2-1) The filter-driving mechanism 323 includes the motor 3231 and the pinion 3232. The holder 322 holding the optical filter 311 is moved because the pinion 3232 in occlusion with the rack 3224 formed on the holder 322 is rotated by driving of the motor 3231. With this arrangement, the optical filter 311 is continuously moved, so that the converting sections 3112 of the optical filter 311 can partially be set against the optical path of the illumination light beam. Accordingly, the degree of the conversion for the incident light beam can continuously be adjusted, thus projecting the optical image converted in some degrees as necessary.

(3) Third Embodiment

Next, a projector according to a third embodiment of the present invention will be described below. The third embodiment differs from the first and second embodiments in the arrangement of the filtering films at the optical filter of the optical corrector. Other structures are the same as the first or the second embodiment. Incidentally, in the following description, the same reference numerals will be attached to the same or substantially the same components as the above-described components to omit the description thereof.

The optical corrector 31 provided on the projector of the third embodiment has an optical filter 331 instead of the optical filter 311 of the first and second embodiments. The optical filter 331 is so arranged that the filtering films can be set against the light beam incident on the outer edge of the optical filter 331, while no filtering film is set against the light beam incident on the inner side thereof, when converting the incident light beam.

Figure 11:
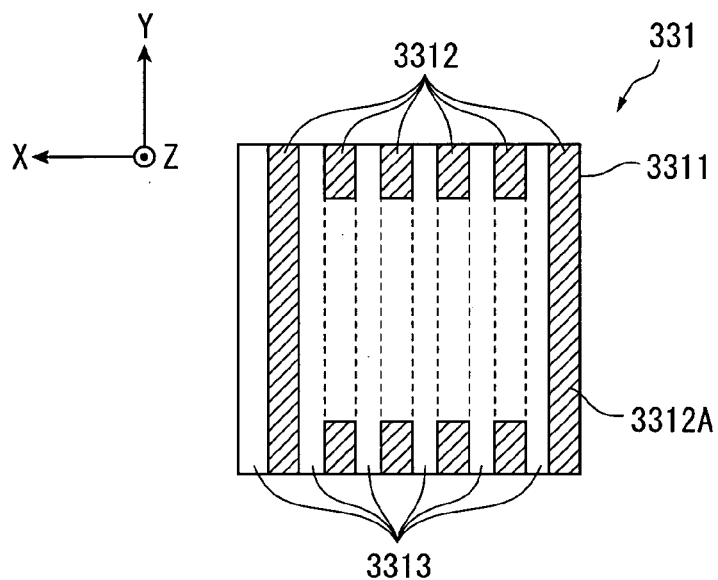
FIG. 11 is an illustration schematically showing a pattern of filtering films of an optical filter according to a third embodiment.

Referring to FIG. 11, a pattern of the filtering films formed on the converting sections 3312 of the optical filter 331 is shown.

As shown in FIG. 11, in the optical filter 331, six converting sections 3312 and six non-converting sections 3313 are alternately formed on a light transmissive board 3311 made of glass or synthetic resin etc. Filtering films 3312A (shaded portion in FIG. 11) are formed on the two converting sections 3312 disposed on the both sides of the optical filter 331 in the width direction (X-axial direction) out of the six converting sections 3312 so as to cover substantially entirely in the longitudinal direction (Y-axial direction). Besides, filtering films 3312A are formed on the parts near the both ends in the longitudinal direction (Y-axial direction) of the four converting sections 3312 disposed on the inner side in the width direction (X-axial direction), while no filtering film 3312A is formed on the inner sides of the four inner converting sections 3312. Note that, the filter 3312A adjusts the color tone of the optical image formed at the optical unit 1 by converting the color tone of the incident light beam, in other words, by reducing the transmittance of the incident light beam (light beam irradiated by the light source lamp 117) of a predetermined wavelength, the filtering film 3312A having the transmittance property (see FIG. 7) as described in the first embodiment.

According to the third embodiment of the present invention, following advantages can be obtained as well as the same advantages as the first and second embodiments.

(3-1) The light beam incident on the outer edge of the optical filter 331 enters thereto by a large angle relative to the liquid crystal panel 441. Entering such light beam while forming the optical image causes the deterioration in the contrast for the optical image to be formed. On the other hand, the filtering films 3312A formed on the converting sections 3312 are arranged so as to be set against the light beam incident on the outer edge of the optical filter 331. Accordingly, when the light beam incident on the outer edge of the optical filter 331 passes through the filtering films 3312A, the color tone is adjusted and the amount of the transmitting light beam is reduced thus preventing the contrast of the optical image from deteriorating. Further, since the filtering film 3312A is not formed on the inner side of the optical filter 331, the reduction of the light amount as well as the deterioration of the luminance of the light beam incident on the optical filter 331 can be minimized when the light beam passing through the optical filter 331. The high-saturation image can be displayed with the contrast enhanced and the deterioration of the luminance minimized.

(4) Fourth Embodiment

Next, a projector according to a fourth embodiment of the present invention will be described below. The fourth embodiment differs from the first to third embodiments in the transmittance property of the filtering film formed on the optical filter. Other structures are the same as the first, second or third embodiment.

Figure 12:
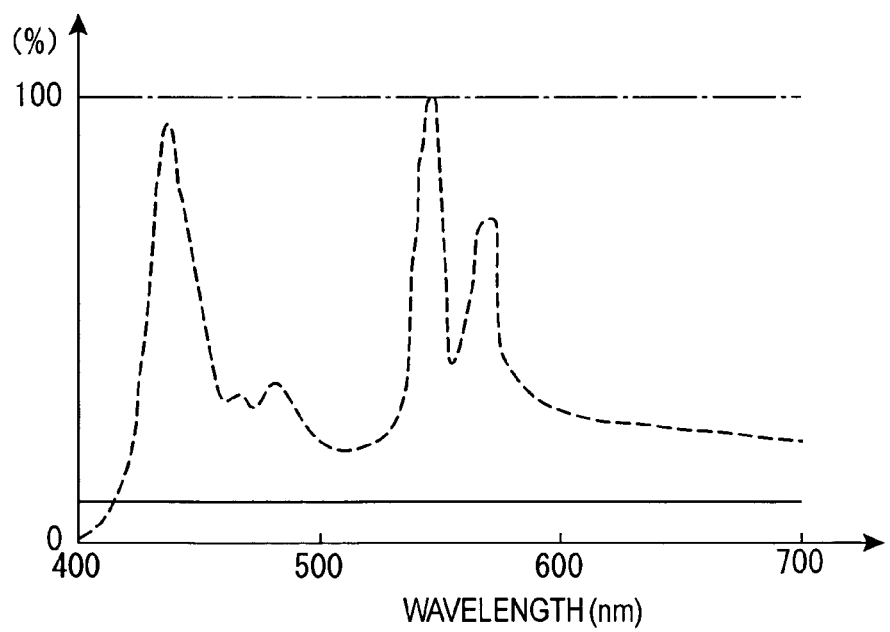
FIG. 12 is a graph showing transmittance property of a filtering film and spectrum intensity of a light source lamp according to a fourth embodiment.

In FIG. 12, transmittance property (solid line) of the filtering film formed on the optical filter 311 and spectrum intensity (dotted line) of the light source lamp 117 are shown according to the fourth embodiment.

As shown in FIG. 12, this filtering film is so configured that the transmittance of the incident light beam (light beam irradiated by the light source lamp 117) within all wavelength range of the visible light region, i.e., that covering the entire wavelength range of 400 nm to 700 nm is reduced into approximately 10% thereof. Namely, the filtering film formed on the optical filter of the fourth embodiment reduces the transmittance of the incident light beam within entire wavelength in order to adjust the luminance of the optical image formed by the optical unit 1.

According to the fourth embodiment, following advantages can be obtained as well as the same advantages as the above-described (1-2) to (1-6), or additionally (2-1) and (3-1).

(4-1) The filtering film formed on the converting sections 3112 of the optical filter 311 reduces the transmittance of the light beam within the entire wavelength of the visible light region into approximately 10% thereof. Accordingly, the amount of the light beam transmitted through the converting sections 3112 will be approximately 10% of the amount of the incident light beam, so that the amount of the transmitting light beam can be largely reduced. By using this transmitting light beam, the low-luminance optical image can be formed. Thus, by setting and unsetting the converting sections 3112 against the optical path of the illumination light beam, the high-luminance display and the low-luminance display can easily be shifted one by one.

(5) Fifth Embodiment

Next, a projector according to a fifth embodiment of the present invention will be described below. The fifth embodiment differs from the first to fourth embodiments in the structure of the filtering film formed on the optical filter. Other structures are the same as the first, second, third or fourth embodiment. Incidentally, in the following description, the same reference numerals will be attached to the same or substantially the same components as the above-described components to omit the description thereof.

In the optical corrector 31 provided on the projector according to the fifth embodiment, an optical filter 351 is used instead of the optical filter 311 of the first to fourth embodiments. Converting sections 3512 formed on the optical filter 351 is so formed that the light transmittance thereof is reduced according to the distance of the filtering films 3512A from the illumination optical axis.

Figure 13:
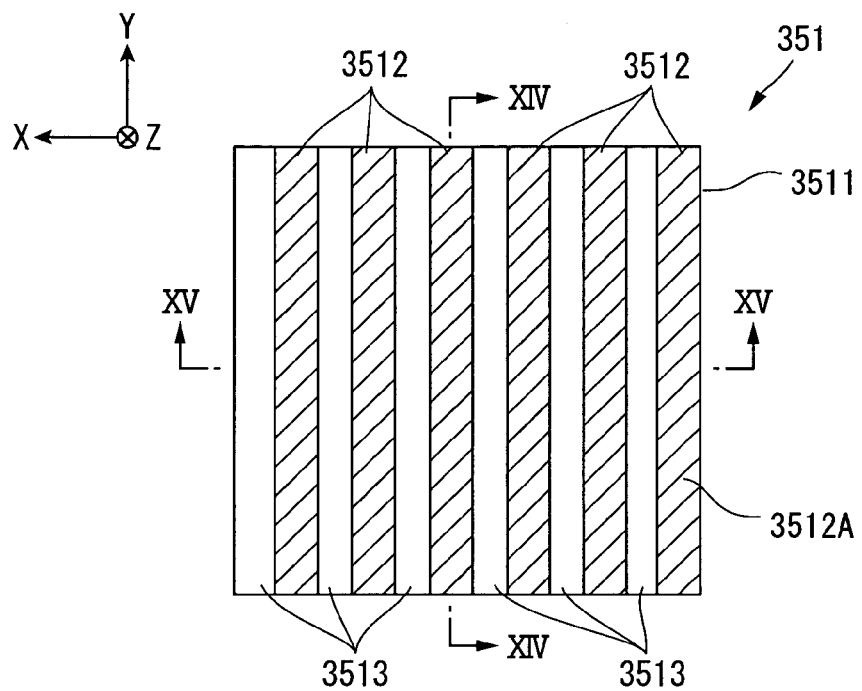
FIG. 13 is an illustration schematically showing a pattern of filtering films of an optical filter according to a fifth embodiment.
Figure 14:
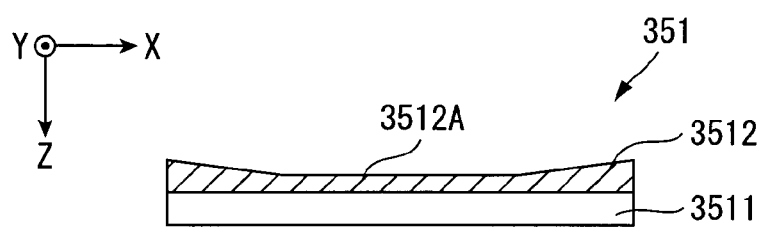
FIG. 14 is a cross-sectional view (as taken along the broken line XIV of FIG. 13) showing the optical filter of the fifth embodiment.
Figure 15:
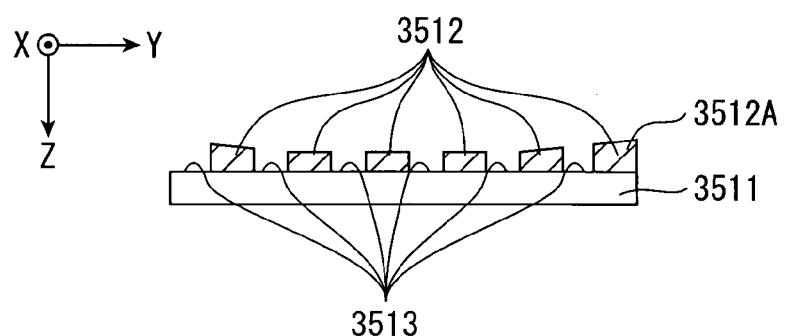
FIG. 15 is a cross-sectional view (as taken along the broken line XV of FIG. 13) showing the optical filter of the fifth embodiment.

In FIG. 13, the pattern of the filtering films 3512A formed on the converting sections 3512 of the optical filter 351 is shown according to the fifth embodiment. Additionally, FIG. 14 shows a cross-sectional view of the optical filter 351 as taken along a broken line XIV of FIG. 13, whereas FIG. 15 shows a cross-sectional view of the optical filter 351 as taken along a broken line XV of FIG. 13.

Referring to FIG. 13, in the optical filter 351, six converting sections 3512 and six non-converting sections 3513 are respectively formed on a light transmissive board 3511 made of glass etc. in the same manner as the optical filter 311 shown in FIG. 6. Filtering films 3512A are formed on the converting sections 3512 so that the transmittance of the light beam is reduced according to the distance of the filtering films 3512A from the illumination optical axis positioned at the substantially center of the optical filter 351. Specifically, the respective filtering films 3512A are so formed that the film configuration thereof is changed in which the transmittance of the light beam is reduced towards the outer side from the inner side in the longitudinal direction (Y-axial direction) as shown in FIG. 14, as well as towards the outer side from the inner side in the width direction (X-axial direction) of the optical filter 351 as shown in FIG. 15.

In other words, the filtering films 3512A deposited on the board 3511 is so formed that the film thickness of the filtering film 3512A increases toward the outer side from the inner side in both longitudinal direction (Y-axial direction) and width direction (X-axial direction). Therefore, when the filtering film 3512A has the transmittance property as shown in FIG. 7, the graph showing the transmittance property in FIG. 7 shifts parallel to the lower degree in the transmittance as the light beam shifts toward the outer side from the inner side in the X and Y-axial directions of the optical filter 351. Accordingly, according to the distance from the illumination optical axis, the transmittance of the light beam incident on the optical filter 315 is reduced.

Incidentally, even when the filtering films 3512A of the optical filter 351 has the transmittance property shown in FIG. 12, the transmittance of the light beam incident on the optical filter 351 is reduced according to the distance from the illumination optical axis in the same manner as described above.

According to the fifth embodiment of the present invention, following advantages can be obtained as well as the same advantages as the first to fourth embodiments.

(5-1) The converting sections 3512 of the optical filter 351 is so formed that the transmittance of the light beam transmitting through the filtering films 3512A is reduced according to the distance from the illumination optical axis. With this arrangement, the color tone of the light beam nearby the illumination optical axis can be converted, while the transmittance of the light beam away from the illumination optical axis is entirely restricted. In the optical filter 351, the light beam passing through the part away from the illumination optical axis would have large incident angle relative to the optical modulator. In particular, in the case of the liquid crystal panel 441 which is incident-angle dependent of the light beam, the light beam passing through the part away from the illumination optical axis likely cause the deterioration of the contrast for the optical image formed by the liquid crystal panel 441. To solve this, the light beam nearby the optical axis, which has relatively large amount and relatively small incident-angle toward the liquid crystal panel 441, is allowed to transmit easily as compared to the light beam away from the optical axis, which has relatively large incident-angle toward the liquid crystal panel 441 and likely causes the deterioration of the contrast, so that the contrast of the optical image to be formed can be enhanced. Additionally, when the filtering films 3512A have the transmittance property shown in FIG. 7, the contrast can be enhanced as well as the high-saturation image can be formed. Thus, when the light beam passed through the optical filter 351 is used for forming the optical image, the high-saturation image with the contrast thereof enhanced can be displayed.

(6) Modifications of Embodiment

The scope of the present invention is not restricted to the above embodiment but includes following modifications as long as an object of the present invention can be achieved.

(6-1) While the optical filter 311, 331 and 351 in which the filtering films are arranged according to the pattern as shown in FIGS. 6, 11 and 13 in the respective above embodiments, an optical filter in which filtering films are arranged according to the pattern different from that of the above embodiments may be applied to the present embodiment.

Referring to FIGS. 16A to 16D, optical filters 361A, 361B, 361C and 361D in which filtering films are arranged according to the respective patterns other than that shown in the above respective embodiments. In the optical filters 361A, 361B, 361C and 361D, six converting sections 3612 and six non-converting sections 3613 are alternately formed on each light transmissive board 3611 made of glass etc. respectively, in the same manner as the optical filters 311, 331 and 351 of the above respective embodiments. Note that, in the respective optical filters 361A, 361B, 361C and 361D, filtering films 3612A are formed on the shaded portions in FIGS. 16A to 16D.

Figure 16A:
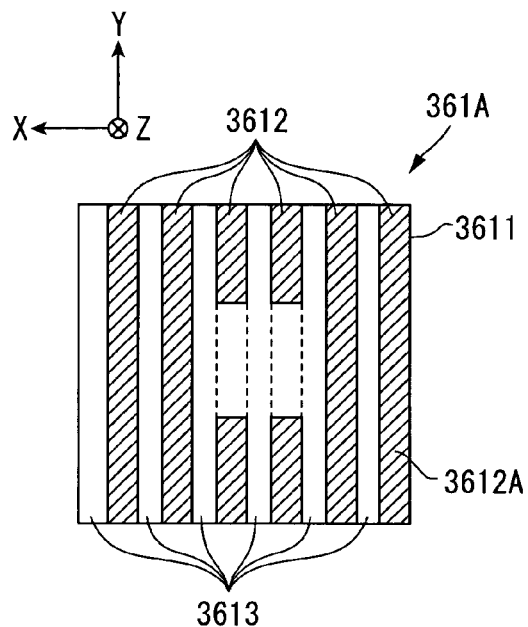
FIG. 16A is an illustration schematically showing a modification of the pattern of the filtering films.

In the pattern as shown in FIG. 16A, the filtering films 3612A are formed on the converting sections 3612 corresponding to the outer edge of the optical filter 361A. Namely, the filtering films 3612A are formed on each two converting sections 3612 on both sides in the width direction (X-axial direction) of the optical filter 361A, i.e., on the four converting sections 3612 in total, so as to entirely cover the converting sections 3612 in the longitudinal direction (Y-axial direction). On the other hand, the filtering films 3612A are formed on the two converting sections 3612, which are formed at the center of the optical filter 361A, at the parts near the both ends in the longitudinal direction (Y-axial direction), while no filtering film 3612A is formed on the middle part of the two center converting sections 3612.

Figure 16B:
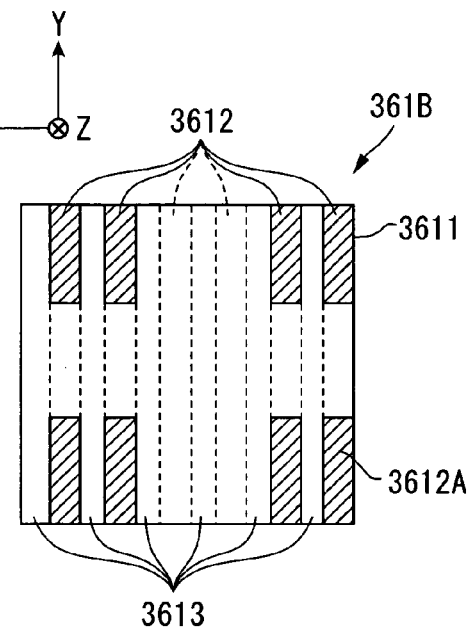
FIG. 16B is an illustration schematically showing another modification of the pattern of the filtering films.

In the pattern as shown in FIG. 16B, the filtering films 3612A are formed on the four corners of the optical filter 361B. Namely, the filtering films 3612A are formed on each two converting sections 3612 on both sides in the width direction (X-axial direction) of the optical filter 361B, i.e., on the four converting sections 3612 in total, at the parts near the both ends in the longitudinal direction (Y-axial direction) respectively. On the other hand, no filtering film 3612A is formed on the two converting sections 3612 formed at the center in the width direction (X-axial direction) of the optical filter 361B.

Figure 16C:
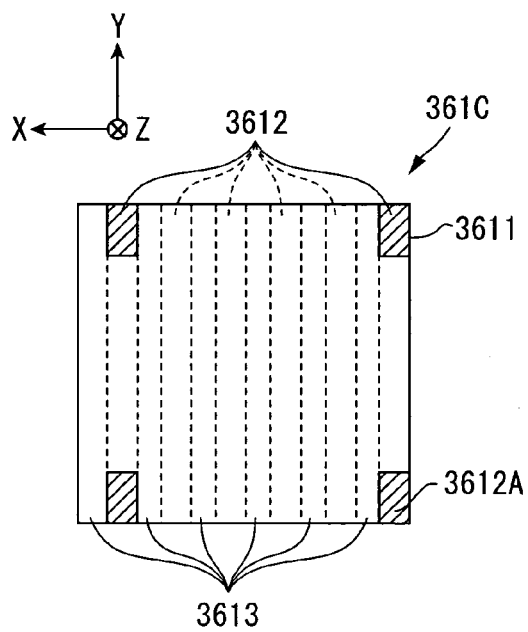
FIG. 16C is an illustration schematically showing still another modification of the pattern of the filtering films, as well as FIG. 16D is an illustration schematically showing yet another modification of the pattern of the filtering films.

In the pattern as shown in FIG. 16C, the filtering films 3612A are formed on the four corners of the optical filter 361C, in the same manner as the optical filter 361B. Namely, the filtering films 3612A are formed on the converting sections 3612 on both sides in the width direction (X-axial direction) of the optical filter 361C, at the parts near the both ends in the longitudinal direction (Y-axial direction) respectively. On the other hand, no filtering film 3612A is formed on the four converting sections 3612 formed at the center in the width direction (X-axial direction) of the optical filter 361C.

Figure 16D:
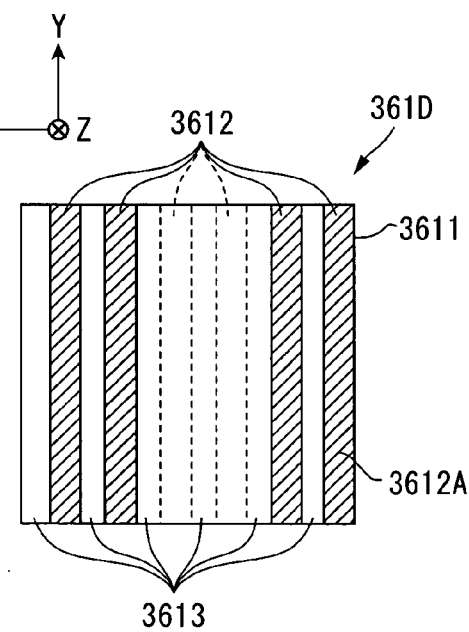

In the pattern as shown in FIG. 16D, the filtering films 3612A are formed on the optical filter 361D on both sides in the width direction (X-axial direction). Namely, the filtering films 3612A are formed on two converting sections 3612 on both sides in the width direction (X-axial direction) of the optical filter 361D, i.e., on the four converting sections 3612 in total, so as to entirely cover the converting sections 3612 in the longitudinal direction (Y-axial direction). On the other hand, no filtering film 3612A is formed on the two converting sections 3612 formed at the center in the width direction (X-axial direction) of the optical filter 361D.

In the optical corrector 31 provided with the optical filter 361A, 361B, 361C or 361D, when the converting sections 3612 are set against the optical path of the illumination light beam, in the case that the transmittance property of the filtering films 3612A is that as shown by the solid-lined graph of FIG. 7, the substantially same advantages as the above third embodiment can be obtained for the optical image to be formed although the color tone, the luminance and the contrast thereof are slightly different from the third embodiment in some degrees. When the transmittance property of the filtering films 3612A is that as shown by the solid-lined graph of FIG. 12, the substantially same advantages as the above fourth embodiment can be obtained, and the contrast of the optical image can be enhanced.

(6-2) While the filtering film having the transmittance property as shown in FIG. 7 or 12 is applied for the optical corrector 31 or 32 in the above embodiments as well as in the above modification of the embodiments, the present invention may apply a filtering film having the other transmittance property to the optical corrector 31 or 32.

Figure 17:
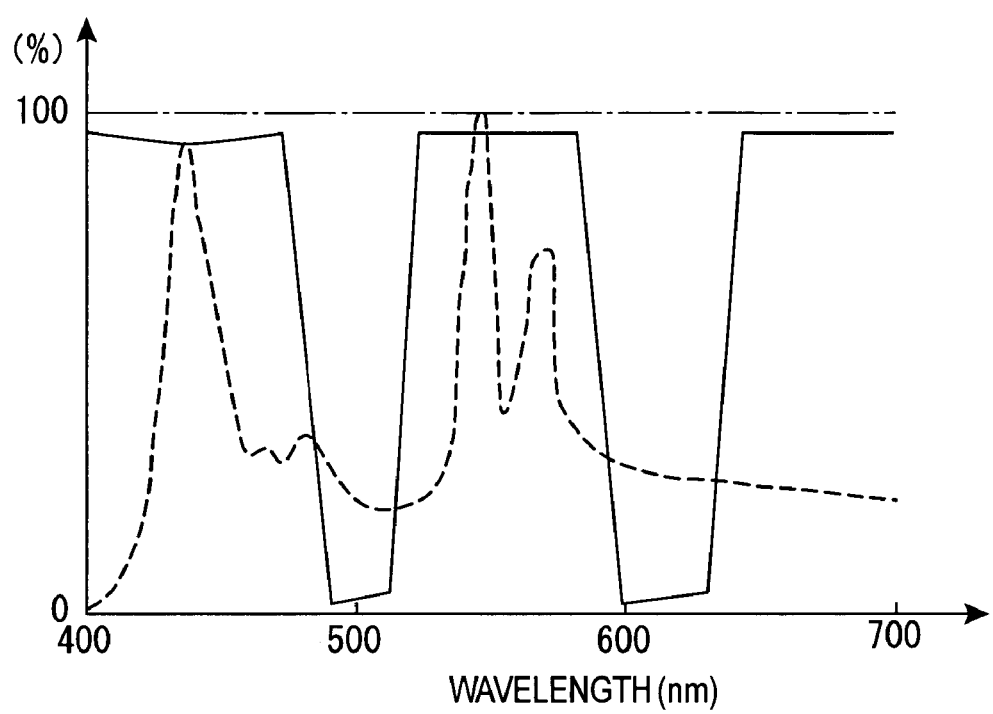
FIG. 17 is a graph showing the transmittance property of the filtering film and the spectrum intensity of the light source lamp according to each of the above-described embodiments.

FIG. 17 shows the transmittance property of the filtering film other than that of the above respective embodiments. Note that, a dotted line indicates the spectrum intensity of the light source lamp 117.

The filtering film shown in FIG. 17 has the transmittance property that reduces the incident light beam (irradiated by the light source lamp 117) of the component light having the wavelength range of around 500 nm and around 600 nm, i.e., the component light (bluish-green component light) around the border of the blue wavelength range and the green wavelength range as well as the component light (yellow to yellowish-red component light) around the border of the green wavelength range and the red wavelength range into approximately 10% or less. When using the optical filter on which the above filtering film is formed, the accuracy of separating the color lights by way of the dichroic mirrors 121 and 122 can be enhanced, thus realizing high-purity color lights. Accordingly, the saturation of the optical image to be formed can further be enhanced.

(6-3) While no filtering film is formed on the non-converting section of the optical filter in the above embodiments as well as in the above modifications of the embodiments, a filtering film having properties different from that of the filtering film formed on the converting section, as a second converting section.

(6-4) While the six converting sections and the six non-converting sections are formed on the optical filter in the above embodiments as well as in the above modifications of the embodiments, the present invention is not limited thereto. The optical filter may have any configurations as long as the converting section and the non-converting section, or the first converting section and the second converting section are formed corresponding to the opening of the mask, and besides, setting and unsetting of the converting section and the non-converting section, or of the first converting section and the second converting section can be switched against the optical path of the illumination light beam. Thus, the number of the converting section and the non-converting section, or that of the first converting section and the second converting section can be appropriately changed in accordance with the configuration of the polarization converter.

(6-5) While the polarization converter 114 in which the polarization-separating films 1141 and the reflection films 1143 are alternately arranged and slanted in a predetermined direction against the illumination optical axis (Z-axial direction) in the above embodiments as well as in the above modifications of the embodiments, the polarization converter of the present invention is not limited thereto. As shown in FIG. 14 (translator's comment: correctly, FIG. 18), the polarization converter 114A in which the polarization-separating films 1141 and the reflection films 1143 are arranged so as to face with each other about the center of the polarization converter.

Figure 18:
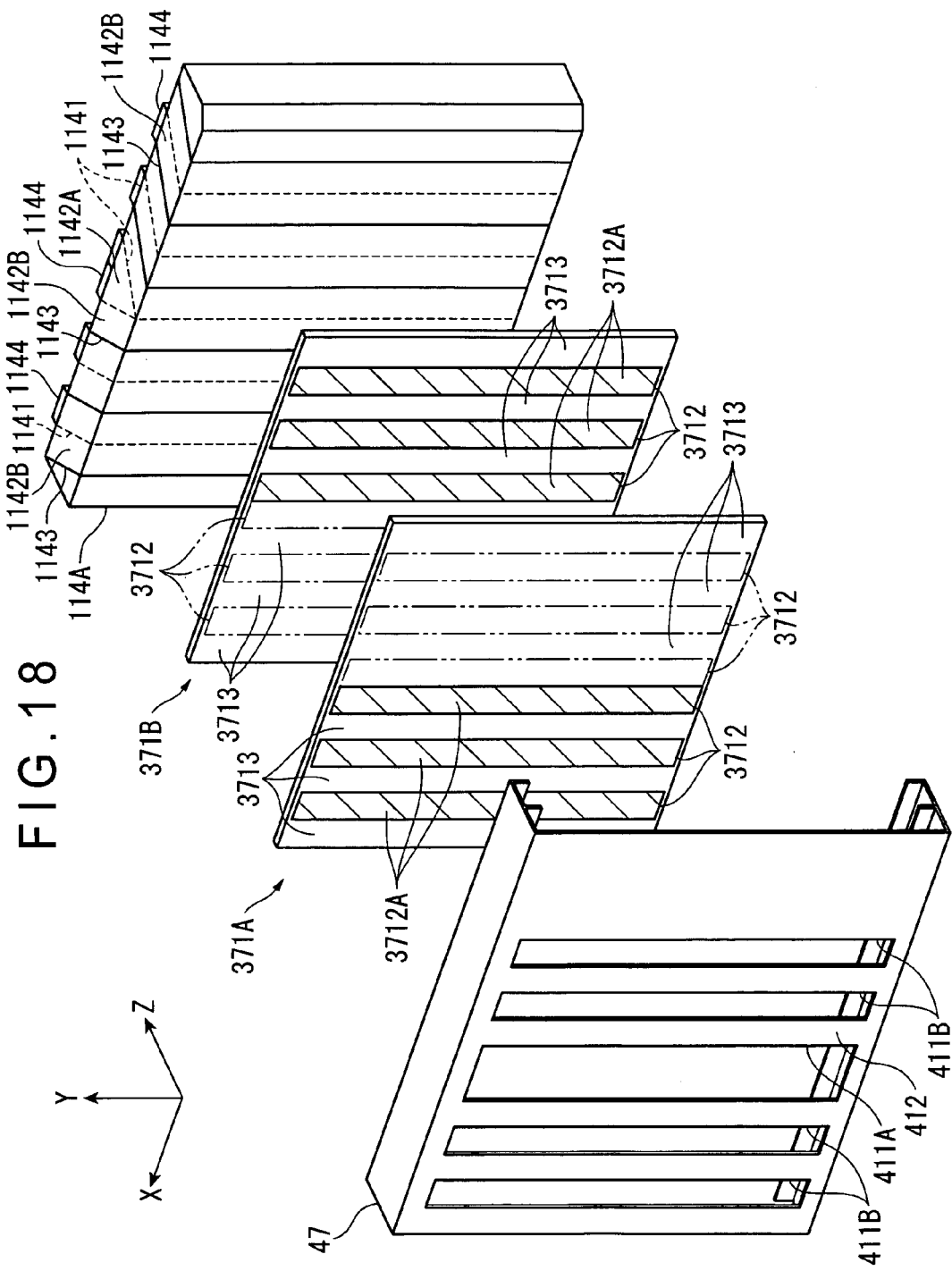
FIG. 18 is a perspective view briefly showing a modification of a polarization converter, the optical corrector and the mask according to each of the above-described embodiments.

The polarization converter 114A has a plurality of prisms 1142, a plurality of polarization-separating films 1141 and a plurality of reflection films 1143 respectively formed along the boundaries of the plurality of prisms 1142 in the same manner as the above polarization converter 114. The polarization-separating films 1141, the prisms 1142 and the reflection films 1143 are arranged symmetrical about the center of the polarization converter 114A in the width direction (X-axial direction). Specifically, prisms 1142B having a substantially parallelogram cross-section are arranged symmetrically about the center of a substantially triangular prism 1142A, so that the same number of the prisms 1142B are arranged on the two crossing sides of the prism 1142A. The polarization-separating films 1141 and the reflection films 1143 are alternately arranged along the boundaries of the prisms 1142 towards the outside from the center of the polarization converter 114A. Additionally, the retardation plate 1144 is provided on the light-irradiation side of the prism 1142 where the light beam passing through the polarization-separating film 1141 enters. In FIG. 18, the polarization-separating films 1141 are indicated by dotted lines for convenience.

The mask 47 is provided on the upstream of the optical path of the polarization converter 114A, and the two optical correctors (not shown) are provided between the mask 47 and the polarization converter 114A.

The mask 47 is a light shield that blocks a part of the light incident on the polarization converter 114A. The mask 47 guides the movement of the optical filters 371 respectively provided on the optical correctors 37 in the width direction (±X-axial direction), the mask 47 holding the two optical correctors. Openings 411 and the shield portions 412 are formed on the mask 47 along a surface parallel to the XY-plane in the same manner as the masks 41 and 42. Openings 411A formed at the center out of the openings 411 is twice larger than other openings 411B. In other words, the openings 411 are formed corresponding to the polarization-separating films 1141 of the polarization converter 114A. On the other hand, the shield portions 412 are formed corresponding to the reflection films 1143 of the polarization converter 114A.

The two optical correctors disposed on the downstream of the mask 47 has the substantially same configurations. Though not particularly shown, each of the optical correctors includes an optical filter 371 (371A, 371B), a holder for holding the optical filter 371 and a filter-driving mechanism that moves the holder in the same manner as the optical correctors 31 and 32. The filter-driving mechanism, which moves the optical filter 371 in ±X-axial direction, may use either the above-described filter-driving mechanism 313 or 323.

Each of the optical filters 371A and 371B of the optical correctors includes a light transmissive board 3711 in the same manner as the above-described optical filter 311 with converting sections 3712 and non-converting sections 3713 formed on the surface of the light-incident side of the board 3711. More in detail, on the board 3711, the converting sections 3712 and the non-converting sections 3713, which are the six converting sections 3712 and the six non-converting sections in total, are alternately formed from the center toward the both sides of the board 3711 in the X-axial direction. In other words, the converting sections 3712 are formed on the surface of the light-incident side of the board 3711 at the position corresponding to the openings 411A of the mask 47.

On the optical filter 371A, the certain converting sections 3712 on the side of the +X-axial direction out of the all converting sections 3712, i.e., the three converting sections 3712 on the side of the +X-axial direction counted from the center of the board 3711 have the filtering films 3712A deposited thereon. On the optical filter 371B, the certain converting sections 3712 on the side of the −X-axial direction, i.e., the three converting sections 3712 on the side of the −X-axial direction counted from the center of the board 3711 have the filtering films 3712A deposited thereon.

Incidentally, such filtering film having the transmittance property shown in FIG. 7, 12 or 17 may be applied to the filtering film 3712A, whereas such pattern shown in FIG. 13, 16A, 16B, 16C or 16D may be applied to the pattern of the filtering films 3712A.

Now, it will be described below in detail how the light beam incident on the polarization converter 114A is optically converted by way of the two optical correctors provided with the optical filters 371A and 371B.

When the light beam incident on the polarization converter 114A is converted, the filter-driving mechanisms respectively provided on the optical correctors allow the holders holing the optical filters 371A and 371B to move in the ±X-axial direction, so that the positions of the openings 411 of the mask 47, that of the polarization-separating films 1141 of the polarization converter 114A and that of the filtering films 3712A formed on the converting sections 3712 of the optical filters 371A and 371B are consisted with each other. At this time, in the optical corrector provided with the optical filter 371A, the optical filter 371A is moved in the −X-axial direction from the position not optically converting the incident light beam by way of the filter-driving mechanism, whereas, in the optical corrector provided with the optical filter 371B, the optical filter 371B is moved in the +X-axial direction from the position not optically converting the incident light beam by way of the filter-driving mechanism in the same manner as the former optical corrector with the optical filter 371A.

On the other hand, when the light beam incident on the polarization converter 114A is not converted, the respective filter-driving mechanisms allow the optical filter 371A to move in the +X-axial direction as well as the optical filter 371B to move in the −X-axial direction, so that the positions of the openings 411, that of the polarization-separating films 1141 and that of the non-converting sections 3713 are consisted with each other, from the state where the positions of the openings 411 of the mask 47, that of the polarization-separating films 1141 of the polarization converter 114A and that of the filtering films 3712A of the optical filters 371A and 371B are consisted with each other.

With the above polarization converter 114A, the deviation between the optical axis of the light beam incident on the polarization converter 114A and the light beam irradiated by the polarization converter 11 4A can be avoided.

In other words, in the polarization converter 114 in which the polarization-separating films 1141 and the reflection films 1143 are alternately arranged, since the polarization-separating films 1141 and the reflection films 1143 are inclined in the same direction, the optical axis of the light beam passing through the polarization converter 114 is irradiated by the polarization converter 114 by deviating for one-fourth pitch of the polarization-separating film 1141 in the X-axial direction as shown in FIG. 2.

In contrast, when using the polarization converter 114A, since the polarization-separating films 1141 and the reflection films 1143 are arranged so as to face with each other about the center of the polarization converter 114A, the deviation between the optical axis of the light beam incident on the polarization converter 114A and that of the light beam irradiated by the polarization converter 114A can be prevented. Further, because the optical correctors are provided on the upstream of the polarization converter 114A, the mode can be switched between the case optically converting the light beam incident on the polarization converter 114A and the case not converting.

Figure 19:
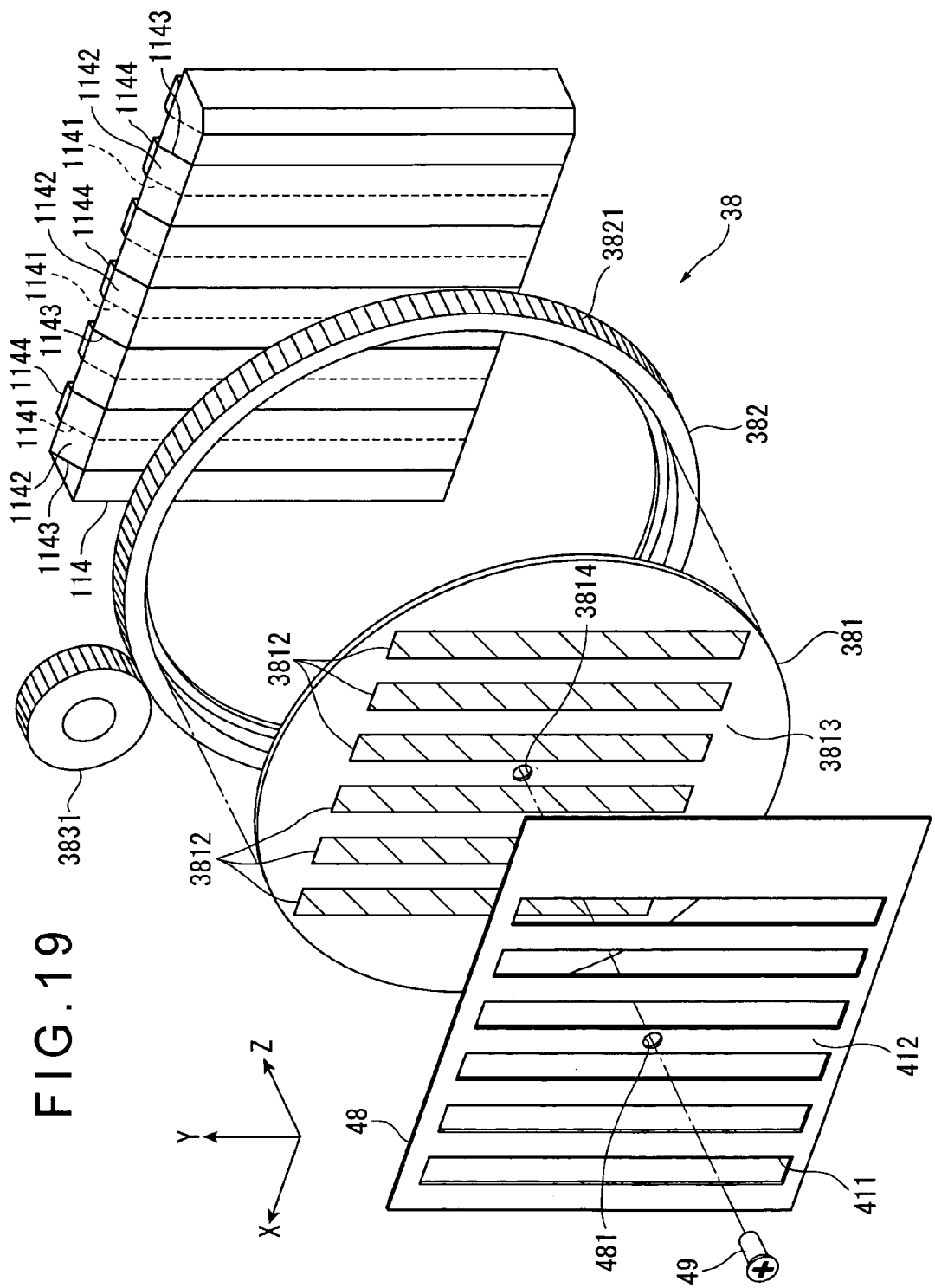
FIG. 19 is a perspective view briefly showing another modification of the optical corrector and the mask according to each of the above-described embodiments.

(6-6) While the optical correctors 31 and 32 allow the holders 312 and 322 to move in the width direction (±X-axial direction) in the above embodiments as well as in the above modifications of the embodiments, an optical corrector 38 in which an optical filter 381 is rotated around the illumination optical axis on a plane (XY-plane) substantially perpendicular to the illumination optical axis as shown in FIG. 19. In FIG. 19, the polarization-separating films 1141 are indicated by dotted lines for convenience.

The optical corrector 38 is disposed on the upstream of the polarization converter 114, and on the downstream of the mask 48. The six openings 411 are formed on the mask 48 corresponding to the polarization-separating films 1141 of the polarization converter 114. Additionally, the shield portion 412 for blocking the incident light beam corresponding to the reflection films of the polarization converter 114 are formed on the surface of the light-incident side of the mask 48. Further, a hole 481, to which a shaft 49 such as a screw or the like for rotatably supporting the optical filter 381 of the optical corrector 38 is inserted, is formed at the substantially center of the light-incident surface of the shield portion 412.

The optical corrector 38 includes the optical filter 381, a holder 382 as a holder frame holding the optical filter 381 and the filter-driving mechanism (not shown) that rotates the holder 382 around the center of the optical filter 381 as its shaft.

Incidentally, the optical filter 381 includes a light transmissive board 3811, which is larger than the polarization converter 114, is formed in a substantially circle. Six converting sections 3812 corresponding to the openings 411 of the mask 48 and a non converting section 3813 corresponding to the shield portion 412 are formed on the light-incident surface of the board 3811. Filtering films 3812A are entirely deposited on the converting sections 3812. Note that, such filtering film having the transmittance property as shown in FIG. 7, 12 or 17 may be applied to the filtering film 3812A, whereas such pattern shown in FIG. 13, 16A, 16B, 16C or 16D may be applied to the pattern of the filtering films 3812A.

Additionally, the hole 3814 to which the above-described shaft 49 is inserted is formed at the center of the optical filter 381.

The holder 382 is a component that holds the optical filter 381 by surrounding the end surface thereof in the circumferential direction. Though not shown, the filter-driving mechanism is constituted of a motor or the like, which is provided with a gear 3831 meshing with a gear teeth 3812 formed on the holder frame 382. Rotation of the gear 3831 by the filter-driving mechanism causes the holder frame 382 to rotate around the center of the optical filter 381.

By rotating the holder 382 by the filter-driving mechanism in the optical corrector 38, the filtering films 3812A formed on the converting sections 3812 of the optical filter 381, the openings 411 of the mask 48, and the polarization-separating films 1141 of the polarization converter 114 can be relatively and partially consisted with each other, thus optically converting the light beam incident on the polarization converter 114. Besides, according to the overlapping state among the filtering films 3812A, the polarization-separating films 1141 and the openings 411, the degree of optical conversion of the light beam incident on the polarization converter 114 can be adjusted. Accordingly, the overlapping state between the filtering films 3812A formed on the converting sections 3812 of the optical filter 381 and the openings 411 of the mask 48 enables the incident light beam to be corrected.

Incidentally, the mask 48 is no need to be provided with a guide or the like to guide the movement of the optical filter unlike in the case of the above-described masks 41 and 42. Accordingly, the configuration of the mask 48 can be simplified.

(6-7) While the optical filter is so formed that the filtering film is deposited on the light transmissive board in the above embodiments as well as in the above modifications of the embodiments, the present invention is not limited thereto. For example, the converting section and the non-converting section of the optical filter can be formed as independent assemblies respectively having different filtering properties to be connected with each other. Further, the filtering films may not be formed by deposition, and thin films respectively having the different filtering properties may adhered on the board by way of an adhesive or the like. Furthermore, the filtering films may not be applied thereto, and optically filtering glasses in which boards themselves absorb the light may be arranged in slit configuration.

(6-8) While the masks 41, 42, 47 and 48 are made of stainless-steel in the above embodiments as well as in the above modifications of the embodiments, the masks may be made of steel and other metal. In other words, the masks may be made of any material as long as the material enables the mask not to transmit the light beam incident on the shield portion, and besides, the material would neither be deformed nor deteriorated due to the heat generated by irradiation of the light beam and to the heat generated inside the projector.

(6-9) While the masks 41, 42, 47 and 48 are disposed on the upstream of the optical correctors 31 and 32 in the above embodiments as well as in the above modifications of the embodiments, the present invention is not limited thereto, and the arrangement can be reversed. In other words, any arrangement is available as long as the light beam passing through the openings of the mask and through either the converting section or the non-converting section of the optical filter, or either the first converting section or the non-converting section thereof enters the polarization converter.

Further, in the above embodiments as well as in the above modifications of the embodiments, the masks 41, 42, 47 and 48 may be omitted. Since the respective sub-beams separated by the first lens array 112 are condensed toward the polarization-separating film 1141 of the polarization converters 114 and 114A, the light beam directly entering the reflection film 1143 is very small amount even if the masks 41, 42, 47 and 48 are omitted. Even when the light beam directly entering the reflection film 1143 causes the polarized light beam of different type to mix into the light beam irradiated by the polarization converters 114 and 114A, the polarized light beam of different type can be eliminated when an optical element such as a polarization plate for aligning the polarization direction is disposed on the downstream of the optical path of the polarization converters 114 and 114A. Thus, the masks 41, 42, 47 and 48 may be omitted.

In contrast, if the masks 41, 42, 47 and 48 are provided, the optical element such as the polarization plate etc. for aligning the polarization direction may be unnecessary. Or, even when an optical element that absorbs the unnecessary polarized light is provided as the above optical element, the amount of the heat generated due to absorption of the light by the optical element can be reduced. Therefore, when the high-contrast image is requested, or when the amount of heat inside the device needs to be reduced, the masks 41, 42, 47 and 48 may preferably be used.

Note that, the masks 41 and 42 include the function for guiding the movement of the holders 312 and 322 of the optical correctors 31 and 32, as is the mask 47. Therefore, when the masks 41, 42 and 47 are omitted, another mechanism is necessary for guiding the movement of holder of the optical corrector.

(6-10) While the drive unit 3132 and the motor 3231 constituted of a solenoid are applied to the filter-driving mechanisms 313 and 323 in the above embodiments as well as in the part of the above modifications of the embodiments, the present invention is not limited thereto. The structure and the configuration of the filter-driving mechanism may be any as long as the optical filter can be moved. For example, the optical filter may be moved by an air cylinder.

(6-11) While the diaphragm 8 adjusts the amount of the light beam by narrowing the optical path of the light beam, the optical path being formed according to the overlapping state of the openings 81A and 82A formed on the slit plates 81 and 82 by moving the slit plates 81 and 82 disposed substantially in parallel, in the directions opposite to each other, in the above embodiments as well as in the above modifications of the embodiments, the present invention is not limited thereto. For example, the amount of transmitting light can be adjusted by moving one of the slit plates, or alternatively, by which a pair of light shields are disposed on the optical path of the light beam so as to open in the light-irradiation direction or the direction opposite thereto in a manner like a double door. Still alternatively, the means for adjusting the amount of light may be a circular opening with its diameter varying. With this arrangement, the contrast may be enhanced on account of the diaphragm effect. The diaphragm may employ any configuration as described above as long as it partially closes the optical path of the light beam and the amount of the transmitting light is reduced.

(6-12) While the diaphragm 8 is disposed between the first lens array 112 and the second lens array 113 in the above embodiments as well as in the above modifications of the embodiments, the present invention is not limited thereto. The diaphragm 8 may be disposed at any position on the optical axis. Incidentally, when the diaphragm 8 is disposed at the certain position between the light source device 111 and the downstream of the superposing lens 115 of the integrator illuminating optical system 11, the amount of the light beam forming the optical image can entirely be adjusted since the diaphragm 8 functions before separation of the light beam into the respective color lights by way of the color-separating optical system 12. Further, when the diaphragms 8 are respectively disposed at the downstream of the color-separating optical system 12 per each color, the amount of the light beam can be adjusted on each color basis, thus further finely adjusting the color saturation of the optical image to be formed.

(6-13) While the filtering film is so formed that the high refractive layer made of tantalum pentoxide ($Ta_2O_5$) and the low refractive layer made of silicon dioxide ($SiO_2$) are alternately layered in the above embodiments as well as in the above modifications of the embodiments, the present invention is not limited thereto. The filtering film may be formed by other configurations. For example, the high reflective layer can be formed by zirconium dioxide ($ZrO_2$) instead of tantalum pentoxide ($Ta_2O_5$).

(6-4) While a projector using three optical modulators are taken as an example in the above embodiments as well as in the above modifications of the embodiments, the present invention may be applied to a projector using a single optical modulator, two optical modulators or more than three optical modulators.

Though a liquid crystal panel 141 is used as the optical modulator in the above embodiments, an optical modulator other than the liquid crystal panel such as a device using a micro-mirror may be used.

Though a light transmissive optical modulator having different light-incident side and light-irradiation side is used in the above embodiments, a reflective optical modulator having common light-incident side and light-irradiation side may be used.

(6-15) While the blue light is passed through the relay optical system 13 of the optical unit 1 in the above embodiments as well as in the above modifications of the embodiments, such a projector including an optical unit that transmits other color light through a relay optical system is available.

While a front-type projector that projects an image in a direction for observing a screen is taken as an example in the above embodiments as well as in the above modifications of the embodiments, the present invention may be applied to a rear-type projector that projects an image in a direction opposite to the direction for observing the screen.

What is claimed is:

1. An illumination device, comprising:
   a light source;

a polarization converter that converts a light beam irradiated by the light source into a substantially uniform linear polarized light, the polarization converter being slanted relative to a central axis of the light beam irradiated by the light source and including a plurality of polarization-separating films and a plurality of light reflection films alternately arranged in a direction substantially orthogonal to the central axis of the light beam irradiated by the light source;

an optical filter provided between the light source and the polarization converter and having a plurality of optical conversion layers that optically converts the incident light beam, the optical conversion layers being arranged in stripes with a pitch corresponding to the arrangement of the polarization-separating films;

a holder frame that holds the optical filter; and a filter-driving mechanism that moves the holder frame in a direction in which the polarization-separating films are arranged.

2. The illumination device according to claim 1, the filter-driving mechanism comprising:

a cam rotatably supported by a light shield and engaged with the holder frame at an end thereof to move the holder frame by rotation of the cam; and a solenoid including a shaft engaged with the other end of the cam to electromagnetically move the shaft.

3. The illumination device according to claim 1, wherein the holder frame includes a rack formed along a moving direction of the holder frame, the filter-driving mechanism comprising:

a motor attached to a light shield with a rotary shaft thereof provided substantially in parallel to the central axis of the light beam irradiated by the light source; and a pinion provided on the rotary shaft of the motor to engage with the rack.

4. The illumination device according to claim 1, wherein the plurality of optical conversion layers convert luminance and/or color tone of the light beam irradiated by the light source.

5. The illumination device according to claim 4, wherein the plurality of optical conversion layers reduce transmittance of a predefined color light of the light beam irradiated by the light source.

6. The illumination device according to claim 4, wherein the plurality of optical conversion layers reduce transmittance of all wavelength range corresponding to a visible light of the light beam irradiated by the light source.

7. The illumination device according to claim 1, wherein the plurality of optical conversion layers are so formed that the transmittance thereof is reduced according to the distance from the central axis of the light beam irradiated by the light source.

8. The illumination device according to claim 1, wherein the plurality of optical conversion layers are provided on an outer edge of the optical filter, while no optical conversion layer is provided on an inner side thereof.

9. The illumination device according to claim 1 wherein the plurality of optical conversion layers are provided on the four corners of the optical filter.

10. The illumination device according to claim 1 wherein the plurality of optical conversion layers are provided on both sides of the optical filter in a direction in which the polarization-separating films are arranged, while no optical conversion layer is provided on the middle part thereof.

11. The illumination device according to claim 1, further comprising:

a light shield disposed on the polarization converter on a side near the light source to block a part of the light beam entering the polarization converter, wherein the light shield includes a plurality of openings and a plurality of shield portions alternately arranged in a direction substantially orthogonal to the central axis of the light beam irradiated by the light source, wherein the openings are formed in slit configuration corresponding to the polarization-separating films, and wherein the shield portions are formed corresponding to the light reflection films.

12. A projector comprising:

the illumination device according to claim 1;

a modulator that modulates a light beam irradiated by the illumination device in accordance with image information to form an optical image; and a projection lens that projects the optical image in an enlarged manner.

13. The projector according to claim 12, further comprising a power conditioning mechanism that regulates electric power being supplied to the light source to adjust luminance of the light beam irradiated by the light source.

14. The projector according to claim 12, further comprising a diaphragm mechanism that partially blocks the light beam irradiated by the light source.

15. An illumination device comprising:

a light source;

a polarization converter that converts a light beam irradiated by the light source into a substantially uniform linear polarized light, the polarization converter including a plurality of polarization-separating films and a plurality of light reflection films alternately arranged in a direction substantially orthogonal to a central axis of the light beam irradiated by the light source;

an optical filter provided between the light source and the polarization converter and having a plurality of optical conversion layers that optically converts the incident light beam, the optical conversion layers being arranged in stripes with the pitch thereof corresponding to the arrangement of the polarization-separating films;

a holder frame that holds the optical filter; and a filter-driving mechanism that rotates the holder frame in a plane substantially orthogonal to the central axis of the light beam irradiated by the light source.

* * * * *